(12) United States Patent
Matsunami

(10) Patent No.: US 11,639,042 B2
(45) Date of Patent: May 2, 2023

(54) PNEUMATIC TIRE COMPRISING FIRST AND SECOND SEALANT LAYERS

(71) Applicant: SUMITOMO RUBBER INDUSTRIES, LTD., Hyogo (JP)

(72) Inventor: Sho Matsunami, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 636 days.

(21) Appl. No.: 16/424,741

(22) Filed: May 29, 2019

(65) Prior Publication Data

US 2020/0001560 A1    Jan. 2, 2020

(30) Foreign Application Priority Data

Jun. 27, 2018    (JP) .............................. JP2018-122019

(51) Int. Cl.
*B60C 19/12*    (2006.01)
*B29C 73/16*    (2006.01)
(Continued)

(52) U.S. Cl.
CPC ........ *B29D 30/0685* (2013.01); *B29C 73/163* (2013.01); *B29C 73/20* (2013.01);
(Continued)

(58) Field of Classification Search
CPC ....... B60C 19/12; B60C 19/122; B29C 73/16; B29C 73/163; B29C 73/166; B29C 73/20;
(Continued)

(56) References Cited

U.S. PATENT DOCUMENTS 1,421,537 A * 7/1922 Needham
1,551,264 A * 8/1925 Palmer
(Continued)

FOREIGN PATENT DOCUMENTS

DE    10 2008 003 554 A1 * 7/2009
JP    60-002203 B2    1/1985
(Continued)

OTHER PUBLICATIONS

English machine translation of JP 2009-269446 A, Nov. 19, 2009.*
(Continued)

*Primary Examiner* — Adrienne C. Johnstone
(74) *Attorney, Agent, or Firm* — Greenblum & Bernstein, P.L.C.

(57) ABSTRACT

The present invention provides a pneumatic tire including a sealant layer that has excellent tear resistance despite its being formed of a generally string-shaped sealant provided continuously and spirally along an inner periphery of the tire. Included is a pneumatic tire including an innerliner and a sealant layer located radially inside the innerliner, the sealant layer including a first sealant layer and a second sealant layer stacked in that order from the innerliner, the first sealant layer including a generally string-shaped sealant provided continuously and spirally along an inner periphery of the tire, the second sealant layer including a generally string-shaped sealant provided continuously and spirally along the first sealant layer, the sealant of the first sealant layer and the sealant of the second sealant layer extending in directions crossing each other.

6 Claims, 11 Drawing Sheets

(51) Int. Cl.
*B29D 30/06* (2006.01)
*B29C 73/20* (2006.01)

(52) U.S. Cl.
CPC .... *B60C 19/122* (2013.01); *B29D 2030/0694* (2013.01); *Y10T 152/10693* (2015.01)

(58) Field of Classification Search
CPC ............. B29C 73/22; B29D 30/0685; B29D 2030/0694; B29D 2030/0686; B29D 2030/0685; B29D 2030/0682; Y10T 152/10666–10711
USPC ................................. 152/502–507; 156/115
See application file for complete search history.

(56) References Cited

U.S. PATENT DOCUMENTS

| | | | | |
|---|---|---|---|---|
| 2,332,913 | A * | 10/1943 | Iknayan | B60C 19/127 156/115 |
| RE25,349 | E * | 3/1963 | Hanson | |
| 6,915,826 | B2 * | 7/2005 | Poling | B29C 73/22 152/502 |
| 9,149,996 | B2 * | 10/2015 | Sugimoto | |
| 9,415,639 | B2 * | 8/2016 | Voge | B29C 73/22 |
| 2005/0061412 | A1 * | 3/2005 | Noto | B60C 5/14 156/117 |
| 2005/0116374 | A1 * | 6/2005 | Ogawa | |
| 2018/0201774 | A1 * | 7/2018 | Sugimoto | B60C 19/122 |
| 2018/0208687 | A1 * | 7/2018 | Sugimoto | B60C 19/122 |
| 2018/0236824 | A1 * | 8/2018 | Kayashima | B29C 73/163 |

FOREIGN PATENT DOCUMENTS

| | | | |
|---|---|---|---|
| JP | 2002-36813 | | 2/2002 |
| JP | 2004358738 | A * | 12/2004 |
| JP | 2009269446 | A * | 11/2009 |
| JP | 2010-528131 | A | 8/2010 |
| LU | 85964 | A1 * | 1/1986 |
| WO | WO-2016060233 | A1 * | 4/2016 |
| WO | WO-2016060246 | A1 * | 4/2016 |
| WO | WO-2017094447 | A1 * | 6/2017 |

OTHER PUBLICATIONS

English machine translation of DE 20 2008 003 554 A1, Jul. 23, 2009.*
English translation of LU 85,964 A1, Jan. 22, 1986.*
English translation of JP 2004-358738 A, Dec. 24, 2004.*
Japan Office Action conducted in counterpart Japan Appln. No. 2018-122019 (dated Mar. 8, 2022).

* cited by examiner

Prior Art

PNEUMATIC TIRE COMPRISING FIRST AND SECOND SEALANT LAYERS

TECHNICAL FIELD

The present invention relates to a pneumatic tire and a method for producing a pneumatic tire.

BACKGROUND ART

Self-sealing tires with sealants applied to their inner periphery are known as puncture resistant pneumatic tires (hereinafter, pneumatic tires are also referred to simply as tires). The sealants automatically seal puncture holes formed in the self-sealing tires.

There are several known methods for producing self-sealing tires, one of which involves adding an organic solvent to a sealant to reduce the viscosity enough to be easy to handle, attaching the diluted sealant to the inner surface of a tire, and removing the organic solvent from the attached diluted sealant. Another method involves mixing a base agent prepared in a batch kneading machine with a curing agent using a static or dynamic mixer to prepare a sealant and attaching the sealant to an inner periphery of a tire (see, for example, Patent Literature 1).

Other attempts have been made to continuously and spirally apply a generally string-shaped sealant to an inner periphery of a tire to form a sealant layer, or to form a sealant layer including two layers (see, for example, Patent Literature 2).

CITATION LIST

Patent Literature

Patent Literature 1: JP 2010-528131 T
Patent Literature 2: JP S60-2203 B

SUMMARY OF INVENTION

Technical Problem

The present inventor has made extensive studies and found the following.

If a tire including a sealant layer formed by continuously and spirally applying a generally string-shaped sealant to an inner periphery of the tire, i.e., a sealant layer including a generally string-shaped sealant provided continuously and spirally along an inner periphery of the tire is punctured at an interface (contact surface) between adjacent portions of the sealant by a puncturing object (for example, a nail of 5 mm φ and 60 mm length), the interface between adjacent portions of the sealant may be torn in the circumferential direction, thereby resulting in sealing failure. Particularly when the interface between adjacent portions of the sealant is punctured by a puncturing object at low temperatures where the sealant has a higher viscosity, tearing in the circumferential direction can occur more easily, resulting in reduced sealing performance.

Thus, the sealant layer including a generally string-shaped sealant provided continuously and spirally along an inner periphery of the tire may not provide good tear resistance as it may tear when an interface between adjacent portions of the sealant is punctured by a puncturing object.

The present invention aims to solve the problem and provide a pneumatic tire including a sealant layer that has excellent tear resistance despite its being formed of a generally string-shaped sealant provided continuously and spirally along an inner periphery of the tire.

Solution to Problem

The present invention relates to a pneumatic tire (self-sealing tire), including an innerliner and a sealant layer located radially inside the innerliner, the sealant layer including a first sealant layer and a second sealant layer stacked in that order from the innerliner, the first sealant layer including a generally string-shaped sealant provided continuously and spirally along an inner periphery of the tire, the second sealant layer including a generally string-shaped sealant provided continuously and spirally along the first sealant layer, the sealant of the first sealant layer and the sealant of the second sealant layer extending in directions crossing each other.

Preferably, the sealant of the first sealant layer and the sealant of the second sealant layer both have a pitch width of 2 mm to 5 mm, and the sealant of the first sealant layer and the sealant of the second sealant layer extend in directions crossing each other at an angle $\theta$ satisfying the following equation (1): $\theta$=arctan (the pitch width of the sealant of the first sealant layer/the inner perimeter of the tire)+arctan (the pitch width of the sealant of the second sealant layer/the inner perimeter of the tire).

Preferably, the first sealant layer and the second sealant layer have different viscosities from each other.

Preferably, the first sealant layer has a lower viscosity than the second sealant layer.

Preferably, the first sealant layer and the second sealant layer have different thicknesses from each other.

The present invention is also directed to a method for producing a pneumatic tire (self-sealing tire) including an innerliner and a sealant layer located radially inside the innerliner, the sealant layer including a first sealant layer and a second sealant layer stacked in that order from the innerliner, the method including:

forming the first sealant layer by continuously and spirally applying a generally string-shaped sealant along an inner periphery of the tire; and forming the second sealant layer by continuously and spirally applying a generally string-shaped sealant along the first sealant layer such that the sealant of the first sealant layer and the sealant of the second sealant layer extend in directions crossing each other.

Preferably, the sealant of the first sealant layer and the sealant of the second sealant layer both have a pitch width of 2 mm to 5 mm, and the sealant of the first sealant layer and the sealant of the second sealant layer extend in directions crossing each other at an angle $\theta$ satisfying the following equation (1): $\theta$=arctan (the pitch width of the sealant of the first sealant layer/the inner perimeter of the tire)+arctan (the pitch width of the sealant of the second sealant layer/the inner perimeter of the tire).

Preferably, the first sealant layer and the second sealant layer have different viscosities from each other.

Preferably, the first sealant layer has a lower viscosity than the second sealant layer.

Preferably, the first sealant layer and the second sealant layer have different thicknesses from each other.

Advantageous Effects of Invention

The present invention provides a pneumatic tire (self-sealing tire) including an innerliner and a sealant layer located radially inside the innerliner. The sealant layer includes a first sealant layer and a second sealant layer stacked in that order from the innerliner. The first sealant layer includes a generally string-shaped sealant provided continuously and spirally along an inner periphery of the tire. The second sealant layer includes a generally string-shaped sealant provided continuously and spirally along the first sealant layer. The sealant of the first sealant layer and the sealant of the second sealant layer extend in directions crossing each other. The sealant layer in such a pneumatic tire has excellent tear resistance despite its being formed of a generally string-shaped sealant provided continuously and spirally along an inner periphery of the tire.

The present invention also provides a method for producing a pneumatic tire (self-sealing tire) including an innerliner and a sealant layer located radially inside the innerliner. The sealant layer includes a first sealant layer and a second sealant layer stacked in that order from the innerliner. The method includes forming the first sealant layer by continuously and spirally applying a generally string-shaped sealant along an inner periphery of the tire; and forming the second sealant layer by continuously and spirally applying a generally string-shaped sealant along the first sealant layer such that the sealant of the first sealant layer and the sealant of the second sealant layer extend in directions crossing each other. Such a method provides a self-sealing tire including a sealant layer that has excellent tear resistance despite its being formed of a generally string-shaped sealant provided continuously and spirally along an inner periphery of the tire.

DESCRIPTION OF EMBODIMENTS

The pneumatic tire (self-sealing tire) of the present invention includes an innerliner and a sealant layer located radially inside the innerliner. The sealant layer includes a first sealant layer and a second sealant layer stacked in that order from the innerliner. The first sealant layer includes a generally string-shaped sealant provided continuously and spirally along an inner periphery of the tire. The second sealant layer includes a generally string-shaped sealant provided continuously and spirally along the first sealant layer. The sealant of the first sealant layer and the sealant of the second sealant layer extend in directions crossing each other.

The pneumatic tire of the present invention may be produced by, for example, the method for producing a pneumatic tire of the present invention, i.e., a method for producing a pneumatic tire including an innerliner and a sealant layer located radially inside the innerliner, wherein the sealant layer includes a first sealant layer and a second sealant layer stacked in that order from the innerliner, and the method includes forming the first sealant layer by continuously and spirally applying a generally string-shaped sealant along an inner periphery of the tire; and forming the second sealant layer by continuously and spirally applying a generally string-shaped sealant along the first sealant layer such that the sealant of the first sealant layer and the sealant of the second sealant layer extend in directions crossing each other.

As mentioned earlier, if a tire including a sealant layer formed by continuously and spirally applying a generally string-shaped sealant to an inner periphery of the tire, i.e., a sealant layer including a generally string-shaped sealant provided continuously and spirally along an inner periphery of the tire is punctured at an interface (contact surface) between adjacent portions of the sealant by a puncturing object (for example, a nail of 5 mm φ and 60 mm length), the interface between adjacent portions of the sealant may be torn in the circumferential direction, thereby resulting in sealing failure. Particularly when the interface between adjacent portions of the sealant is punctured by a puncturing object at low temperatures, tearing in the circumferential direction can occur more easily, resulting in reduced sealing performance. Thus, the sealant layer including a generally string-shaped sealant provided continuously and spirally along an inner periphery of the tire may not provide good tear resistance as it may tear when an interface between adjacent portions of the sealant is punctured by a puncturing object.

The present inventor has made further extensive studies on the problem discovered by the inventor. As a result, the following has been found.

Figure 13A:
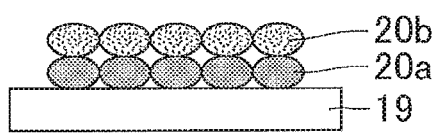
FIGS. 13A to 13F are schematic views illustrating the behavior of first and second sealant layers when the tire is punctured by a nail.
Figure 13D:
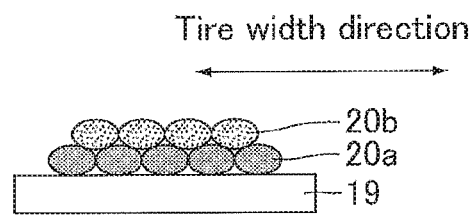
Figure 13B:
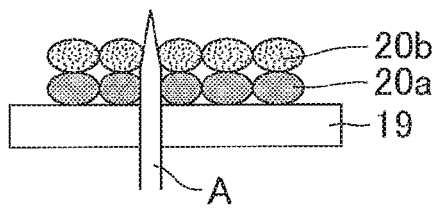
Figure 13E:
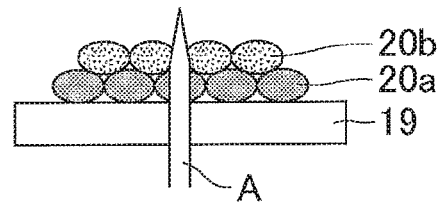
Figure 13C:
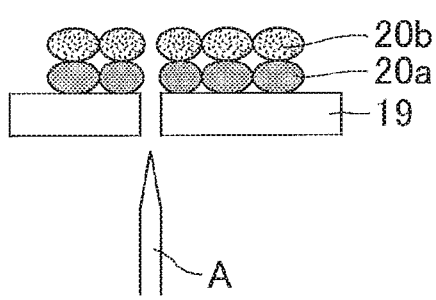

In the case of a tire including a sealant layer in which the sealant layer includes a first sealant layer and a second sealant layer stacked in that order from an innerliner; the first sealant layer includes a generally string-shaped sealant provided continuously and spirally along an inner periphery of the tire; the second sealant layer includes a generally string-shaped sealant provided continuously and spirally along the first sealant layer; the sealant of the first sealant layer and the sealant of the second sealant layer are provided in the same circumferential direction; and the sealant of the first sealant layer and the sealant of the second sealant layer are aligned without a gap (or in line with each other) in the tire width direction (see FIG. 13A), the interfaces between adjacent portions of the sealant of the first sealant layer are located at the same locations in the tire width direction as those of the sealant of the second sealant layer. Thus, if the interface between adjacent portions of the sealant is punctured by a puncturing object (see FIG. 13B), both the interfaces between adjacent portions of the sealants of the first and second sealant layers may be torn in the circumferential direction, and thus no sealant may adhere to the puncturing object, resulting in sealing failure (see FIG. 13C).

In contrast, when the sealant of the first sealant layer and the sealant of the second sealant layer extend in directions crossing each other as in the present invention (see FIG. 12A and FIG. 13D), the presence of both the sealants of the first and second sealant layers extending in different directions can prevent the interfaces between adjacent portions of the sealants from tearing in the circumferential direction. Thus, the sealants can adhere to the puncturing object and form a suitable seal when pulled by the puncturing object (see FIG. 13F).

In general, when the sealant of the first sealant layer and the sealant of the second sealant layer extend in directions crossing each other (see FIG. 13D), it is very improbable that the interfaces between adjacent portions of the sealant of the first sealant layer could be located at the same locations in the tire width direction as those of the sealant of the second sealant layer. If a puncturing object punctures the interface between adjacent portions of the sealant of one of the sealant layers (see FIG. 13E), there is no possibility of the other sealant layer tearing at the interfaces between adjacent portions of the sealant in the circumferential direction. Thus, the sealant of the other sealant layer can adhere to the puncturing object and form a suitable seal when pulled by the puncturing object (see FIG. 13F).

Moreover, even if some interfaces between adjacent portions of the sealant of the first layer are located at the same locations in the tire width direction as those of the sealant of the second sealant layer, the presence of both the sealants of the first and second sealant layers extending in different directions can prevent the interfaces between adjacent portions of the sealants from tearing in the circumferential direction, as described above. Thus, a suitable seal can be achieved.

As described, the pneumatic tire of the present invention is a pneumatic tire (self-sealing tire) including an innerliner and a sealant layer located radially inside the innerliner, wherein the sealant layer includes a first sealant layer and a second sealant layer stacked in that order from the innerliner; the first sealant layer includes a generally string-shaped sealant provided continuously and spirally along an inner periphery of the tire; the second sealant layer includes a generally string-shaped sealant provided continuously and spirally along the first sealant layer; and the sealant of the first sealant layer and the sealant of the second sealant layer extend in directions crossing each other. The sealant layer in such a pneumatic tire has excellent tear resistance despite its being formed of a generally string-shaped sealant provided continuously and spirally along an inner periphery of the tire. Further, the pneumatic tire also provides good sealing performance after running and good sealing performance at low temperatures.

It is sufficient for the sealant layer to include at least two layers including a first sealant layer and a second sealant layer, and additional layers may also be provided as long as the effects of the present invention are not impaired. Preferably, no additional layer is provided between the first sealant layer and the second sealant layer. In other words, the first sealant layer is preferably in contact with the second sealant layer. In this case, the presence of both sealants extending in different directions from each other can more suitably prevent tearing of the interfaces.

In general, the sealing performance of a self-sealing tire that includes a sealant layer at an inner surface to prevent punctures may be roughly classified into the following four types:

1) sealing performance when the tire is punctured by a foreign object such as a nail during running;

2) sealing performance when the foreign object is removed from the tire due to a centrifugal force applied during high speed running after the hole formed by the foreign object is widened as the rubber around the puncturing foreign object is broken due to twisting or heating of the foreign object caused by running of the tire punctured by the foreign object;

3) sealing performance when the foreign object is removed by the driver after the driver becomes aware of the punctured tire as the internal pressure alarm is activated due to a decrease in internal pressure caused by gradual leakage of air from the tire in which the hole formed by the foreign object is widened by running of the tire punctured by the foreign object; and 4) sealing performance corresponding to 3) in a very low temperature environment.

Conventional self-sealing tires usually have satisfactory sealing performance of type 1) (initial sealing performance) but do not provide satisfactory sealing performances of types 2) and 3) (sealing performance after running). Although sealing performances of types 2) and 3) may be ensured by using a sealant having a relatively high viscosity, it is then difficult to simultaneously achieve sealing performance of type 4) (sealing performance at low temperatures) because such a highly viscous sealant has an excessively high viscosity at low temperatures.

In contrast, when the sealant layer to be located radially inside the innerliner includes a stack of a first sealant layer having a low viscosity and a second sealant layer having a high viscosity, with the first sealant layer being on the innerliner side and the second sealant layer being on the tire cavity side (radially inside the first sealant layer), it can seal large holes with the high viscosity second sealant layer and can seal holes at low temperatures with the low viscosity first sealant layer. This enables simultaneous achievement of sealing performance after running and sealing performance at low temperatures, which is difficult with conventional self-sealing tires. Further, good initial sealing performance is also provided.

Moreover, it is also possible to make a seal with the high viscosity second sealant layer in the summer when the temperature is high, or with the low viscosity first sealant layer in the winter when the temperature is low, thereby achieving sealing performance both in summer and in winter.

Thus, in further embodiments of the present invention, the first sealant layer has a lower viscosity than the second sealant layer. The sealant layer with these layers has excellent tear resistance despite its being formed of a generally string-shaped sealant provided continuously and spirally along an inner periphery of the tire; at the same time, it enables simultaneous achievement of sealing performance after running and sealing performance at low temperatures, which is difficult with conventional self-sealing tires. Further, good initial sealing performance is also provided. Moreover, it is also possible to make a seal with the high viscosity second sealant layer in the summer when the temperature is high, or with the low viscosity first sealant layer in the winter when the temperature is low, thereby achieving sealing performance both in summer and in winter.

Figure 11:
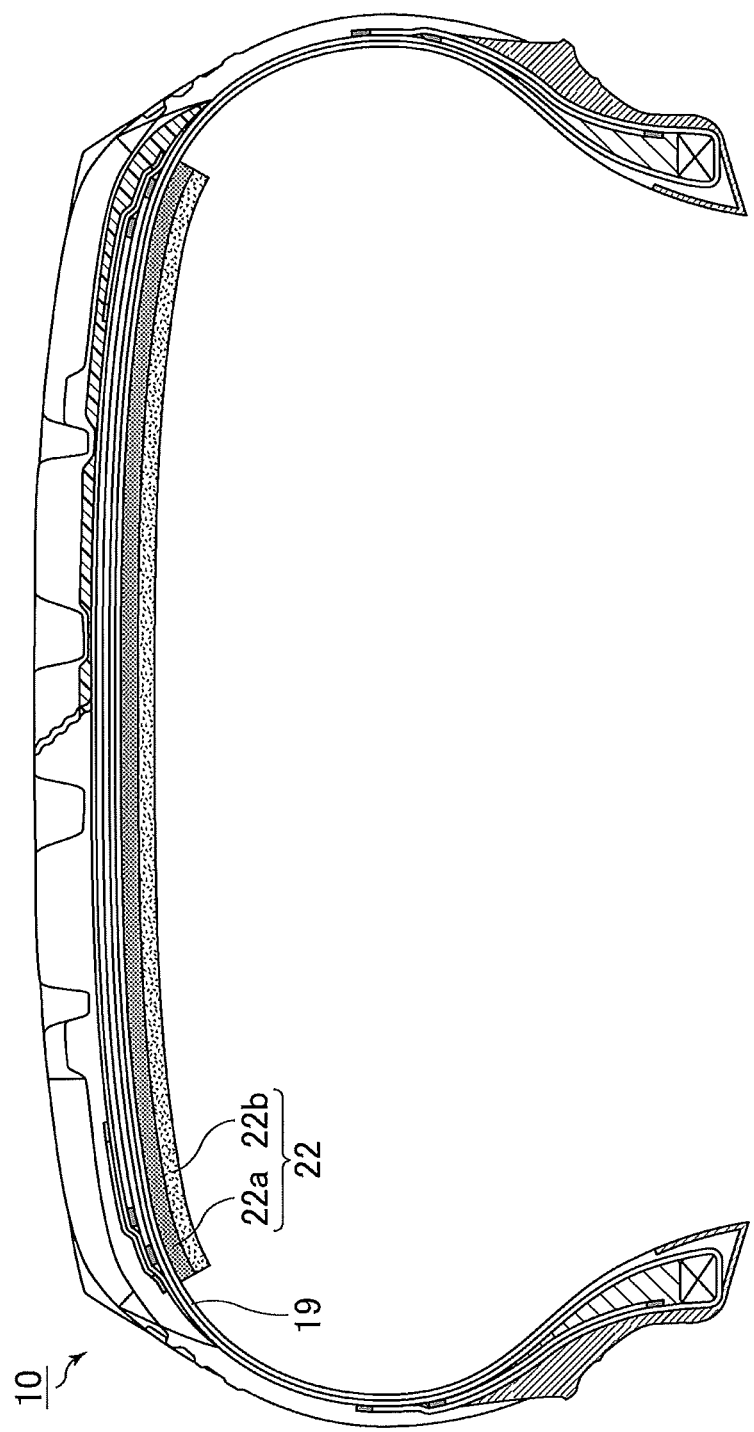
FIG. 11 is a schematic view illustrating exemplary first and second sealant layers.
Figure 14A:
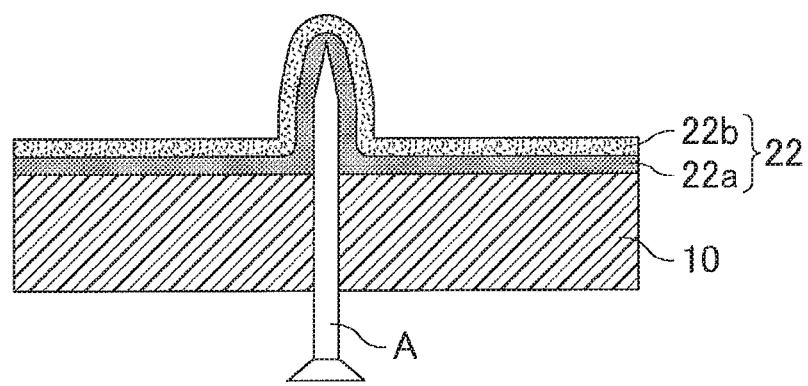
FIGS. 14A, 14B, and 14C are schematic views illustrating the behavior of first and second sealant layers when the tire is punctured by a nail.
Figure 14B:
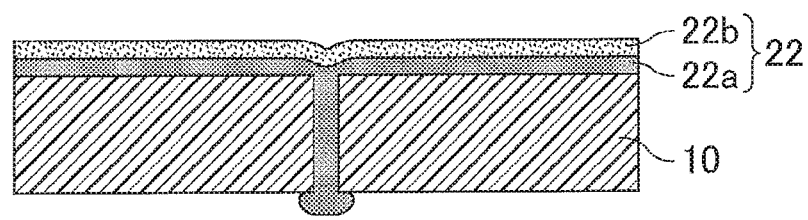
Figure 14C:
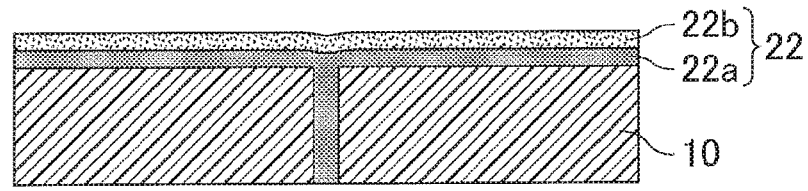

FIG. 11 is a schematic view illustrating exemplary first and second sealant layers. FIG. 14 are schematic views illustrating the behavior of first and second sealant layers when the tire is punctured by a nail. As shown in FIGS. 11 and 14, a sealant layer 22 includes a first sealant layer 22a and a second sealant layer 22b stacked in that order from an innerliner 19 provided in a tire 10. As shown in FIG. 14A, after the tire 10 is punctured by a nail A, the nail A is removed, and the hole formed by the nail A is sealed by the sealant layer 22. At high temperatures or when the hole is large, the second sealant layer 22b having a high viscosity mainly seals the hole as shown in FIG. 14B. At low temperatures or when the hole is small, the first sealant layer 22a having a low viscosity mainly seals the hole as shown in FIG. 14C. Thus, it is possible to simultaneously achieve sealing performance after running and sealing performance at low temperatures while ensuring good initial sealing performance and also to achieve sealing performance both in summer and in winter.

Moreover, since the formation of the sealant layer is performed by continuously and spirally applying a generally string-shaped sealant to an inner periphery of a tire and a first sealant layer, it is possible to form a sealant layer in which a sealant is uniformly provided on an inner periphery of a tire (a sealant layer including a generally string-shaped sealant provided continuously and spirally along an inner periphery of a tire), and therefore to stably produce a self-sealing tire having excellent sealing performance with high productivity. The thus produced self-sealing tire, which includes a sealant layer in which a sealant is uniformly provided in the circumferential and width directions of the tire, and especially in the circumferential direction of the tire, is excellent in sealing performance. Further, the tire is less likely to suffer sealant-induced imbalance, and therefore deterioration of tire uniformity can be reduced.

Particularly when the sealant used is a sealant having a composition as described later, more suitable effects can be obtained. Moreover, the sealant having the later-described composition automatically seals puncture holes even in a low temperature environment.

When the sealant having the later-described composition is prepared by using an organic peroxide as a crosslinking agent or by incorporating a rubber component including a butyl-based rubber with a liquid polymer such as liquid polybutene, the sealant can achieve a balanced improvement of adhesion, sealing performance, fluidity, and processability, thereby resulting in more suitable effects. This is probably because the introduction of a liquid polymer component to an organic peroxide crosslinking system using a butyl-based rubber as the rubber component provides adhesion, and especially the use of liquid polymers having different viscosities reduces flowing of the sealant during high-speed running (at high temperatures); therefore, the sealant can achieve a balanced improvement of the above properties.

Moreover, the incorporation of 1 to 30 parts by mass of an inorganic filler relative to 100 parts by mass of the rubber component allows the sealant to achieve a more balanced improvement of adhesion, sealing performance, fluidity, and processability, thereby resulting in more suitable effects.

Suitable examples of methods for producing a self-sealing tire according to the present invention will be described below.

A self-sealing tire may be produced, for example, by preparing a sealant by mixing the components of the sealant, and then attaching the sealant to an inner periphery of a tire by application or other means to form a sealant layer. The self-sealing tire includes the sealant layer located radially inside its innerliner.

The hardness (viscosity) of the sealant needs to be adjusted to a viscosity appropriate for the service temperature by controlling the rubber component and the degree of crosslinking. To this end, the rubber component may be controlled by varying the types and amounts of liquid rubbers, plasticizers, or carbon black used, while the degree of crosslinking may be controlled by varying the types and amounts of crosslinking agents and crosslinking activators used. The viscosities of the first sealant layer and the second sealant layer can be easily controlled as described above.

Any sealant that shows adhesion may be used, including rubber compositions conventionally used to seal tire punctures. A butyl-based rubber may be used as a rubber component constituting a main ingredient of a rubber composition. Examples of the butyl-based rubber include butyl rubber (IIR) and halogenated butyl rubbers (X-IIR) such as brominated butyl rubber (Br-IIR) and chlorinated butyl rubber (Cl-IIR). In particular, in view of fluidity and other properties, either butyl rubber or a halogenated butyl rubber, or both of them, may be suitably used. The butyl-based rubber is preferably used in the form of pellets. Such a pelletized butyl-based rubber can be precisely and suitably supplied to a continuous kneading machine to prepare a sealant with high productivity.

To reduce deterioration of the fluidity of the sealant, the butyl-based rubber used is preferably a butyl-based rubber A having a Mooney viscosity $ML_{1+8}$ at 125° C. of at least 20 but lower than 40 and/or a butyl-based rubber B having a Mooney viscosity $ML_{1+8}$ at 125° C. of at least 40 but not higher than 80. It is particularly suitable to use at least the butyl-based rubber A. When the butyl-based rubbers A and B are used in combination, the blending ratio may be appropriately selected.

The Mooney viscosity $ML_{1+8}$ at 125° C. of the butyl-based rubber A is more preferably 25 or higher, still more preferably 28 or higher, but is more preferably 38 or lower, still more preferably 35 or lower. If the Mooney viscosity is lower than 20, the fluidity may be reduced. If the Mooney viscosity is 40 or higher, the effect of the combined use may not be achieved.

The Mooney viscosity $ML_{1+8}$ at 125° C. of the butyl-based rubber B is more preferably 45 or higher, still more preferably 48 or higher, but is more preferably 70 or lower, still more preferably 60 or lower. If the Mooney viscosity is lower than 40, the effect of the combined use may not be achieved. If the Mooney viscosity is higher than 80, sealing performance may be reduced.

The Mooney viscosity $ML_{1+8}$ at 125° C. is determined in accordance with JIS K-6300-1:2001 at a test temperature of 125° C. using an L-type rotor with a preheating time of one minute and a rotation time of eight minutes.

The rubber component also includes additional materials such as diene rubbers, including, for example, natural rubber (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile-butadiene rubber (NBR), and butyl rubber (IIR). In view of fluidity and other properties, the amount of the butyl-based rubber based on 100% by mass of the rubber component is preferably 90% by mass or more, more preferably 95% by mass or more, particularly preferably 100% by mass.

Examples of liquid polymers that can be used in the sealant include liquid polybutenes, liquid polyisobutenes, liquid polyisoprenes, liquid polybutadienes, liquid poly-α-olefins, liquid polyisobutylenes, liquid ethylene-α-olefin copolymers, liquid ethylene-propylene copolymers, and liquid ethylene-butylene copolymers. In order to impart adhesion and other properties, liquid polybutenes are preferred among these. Examples of the liquid polybutenes include copolymers having a long-chain hydrocarbon molecular structure which is based on isobutene and further reacted with normal butene. Hydrogenated liquid polybutenes may also be used.

In order to prevent the sealant from flowing during high-speed running, the liquid polymer (e.g. liquid polybutene) is preferably a liquid polymer A having a kinematic viscosity at 100° C. of 550 to 625 $mm^2/s$ and/or a liquid polymer B having a kinematic viscosity at 100° C. of 3540 to 4010 $mm^2/s$, more preferably a combination of the liquid polymers A and B.

The kinematic viscosity at 100° C. of the liquid polymer A (e.g. liquid polybutene) is preferably 570 $mm^2/s$ or higher. If the kinematic viscosity is lower than 550 $mm^2/s$, flowing of the sealant may occur. The kinematic viscosity at 100° C. is preferably 610 $mm^2/s$ or lower. If the kinematic viscosity is higher than 625 $mm^2/s$, the sealant may have a viscosity high enough to deteriorate extrudability.

The kinematic viscosity at 100° C. of the liquid polymer B (e.g. liquid polybutene) is preferably 3600 $mm^2/s$ or higher, more preferably 3650 $mm^2/s$ or higher. If the kinematic viscosity is lower than 3540 $mm^2/s$, the sealant may have so low a viscosity that it can easily flow during use of the tire, resulting in deteriorated sealing performance or uniformity. The kinematic viscosity at 100° C. is preferably 3900 $mm^2/s$ or lower, more preferably 3800 $mm^2/s$ or lower. If the kinematic viscosity is higher than 4010 $mm^2/s$, sealing performance may deteriorate.

The kinematic viscosity at 40° C. of the liquid polymer A (e.g. liquid polybutene) is preferably 20000 $mm^2/s$ or higher, more preferably 23000 $mm^2/s$ or higher. When the kinematic viscosity is lower than 20000 $mm^2/s$, the sealant may be so soft that its flowing may occur. The kinematic viscosity at 40° C. is preferably 30000 $mm^2/s$ or lower, more preferably 28000 $mm^2/s$ or lower. When the kinematic viscosity is higher than 30000 $mm^2/s$, the sealant may have so high a viscosity that sealing performance may deteriorate.

The kinematic viscosity at 40° C. of the liquid polymer B (e.g. liquid polybutene) is preferably 120000 $mm^2/s$ or higher, more preferably 150000 $mm^2/s$ or higher. When the kinematic viscosity is lower than 120000 $mm^2/s$, the sealant may have so low a viscosity that it can easily flow during use of the tire, resulting in deteriorated sealing performance or uniformity. The kinematic viscosity at 40° C. is preferably 200000 $mm^2/s$ or lower, more preferably 170000 $mm^2/s$ or lower. When the kinematic viscosity is higher than 200000 $mm^2/s$, the sealant may have so high a viscosity that sealing performance may deteriorate.

The kinematic viscosity is determined at 100° C. or 40° C. in accordance with JIS K 2283-2000.

In the sealant used in the first sealant layer, the amount of the liquid polymer (the total liquid polymers including the liquid polymers A and B) is preferably 200 parts by mass or more, more preferably 230 parts by mass or more per 100 parts by mass of the rubber component. The upper limit is not particularly critical and may be about 300 parts by mass or less. In the sealant used in the second sealant layer, the amount is preferably 250 parts by mass or less, more preferably 220 parts by mass or less per 100 parts by mass of the rubber component. The lower limit is not particularly critical and may be about 150 parts by mass or more. When the amount is within the range indicated above, more suitable effects can be obtained.

The blending ratio of the liquid polymers A and B, if combined, [(amount of liquid polymer A)/(amount of liquid polymer B)] is preferably 10/90 to 90/10, more preferably 30/70 to 70/30, still more preferably 40/60 to 60/40. When the blending ratio is within the range indicated above, good adhesion can be imparted to the sealant.

The organic peroxide (crosslinking agent) to be used may be any conventional compound. The use of an organic peroxide crosslinking system with a butyl-based rubber and a liquid polymer improves adhesion, sealing performance, fluidity, and processability.

Examples of the organic peroxide (crosslinking agent) include acyl peroxides such as benzoyl peroxide, dibenzoyl peroxide, and p-chlorobenzoyl peroxide; peroxyesters such as 1-butyl peroxyacetate, t-butyl peroxybenzoate, and t-butyl peroxyphthalate; ketone peroxides such as methyl ethyl ketone peroxide; alkyl peroxides such as di-t-butyl peroxybenzoate and 1,3-bis(1-butylperoxyisopropyl)benzene; hydroperoxides such as t-butyl hydroperoxide; and dicumyl peroxide and t-butylcumyl peroxide. In view of adhesion and fluidity, acyl peroxides are preferred among these, with dibenzoyl peroxide being particularly preferred. The organic peroxide (crosslinking agent) is preferably used in the form of powder. Such a powdered organic peroxide (crosslinking agent) can be precisely and suitably supplied to a continuous kneading machine to prepare a sealant with high productivity.

In the sealant used in the first sealant layer, the amount of the organic peroxide (crosslinking agent) is preferably 15 parts by mass or less, more preferably 12 parts by mass or less per 100 parts by mass of the rubber component. The lower limit is not particularly critical and may be about 5 parts by mass or more. In the sealant used in the second sealant layer, the amount is preferably 15 parts by mass or more, more preferably 18 parts by mass or more per 100 parts by mass of the rubber component. The upper limit is not particularly critical and may be about 25 parts by mass or less. When the amount is within the range indicated above, more suitable effects can be obtained.

The crosslinking activator (vulcanization accelerator) to be used may be at least one selected from the group consisting of sulfenamide, thiazole, thiuram, thiourea, guanidine, dithiocarbamate, aldehyde-amine, aldehyde-ammonia, imidazoline, xanthate, and quinone dioxime compounds (quinoid compounds). For example, it may suitably be a quinone dioxime compound (quinoid compound). The use of a crosslinking system including a crosslinking activator in addition to an organic peroxide with a butyl-based rubber and a liquid polymer improves adhesion, sealing performance, fluidity, and processability.

Examples of the quinone dioxime compound include p-benzoquinone dioxime, p-quinone dioxime, p-quinone dioxime diacetate, p-quinone dioxime dicaproate, p-quinone dioxime dilaurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di(p-chlorobenzoate), p-quinone dioxime di(p-nitrobenzoate), p-quinone dioxime di(m-nitrobenzoate), p-quinone dioxime di(3,5-dinitrobenzoate), p-quinone dioxime di(p-methoxybenzoate), p-quinone dioxime di(n-amyloxybenzoate), and p-quinone dioxime di(m-bromobenzoate). In view of adhesion, sealing performance, and fluidity, p-benzoquinone dioxime is preferred among these. The crosslinking activator (vulcanization accelerator) is preferably used in the form of powder. Such a powdered crosslinking activator (vulcanization accelerator) can be precisely and suitably supplied to a continuous kneading machine to prepare a sealant with high productivity.

In the sealant used in the first sealant layer, the amount of the crosslinking activator (e.g. quinone dioxime compound) is preferably 15 parts by mass or less, more preferably 12 parts by mass or less per 100 parts by mass of the rubber component. The lower limit is not particularly critical and may be about 5 parts by mass or more. In the sealant used in the second sealant layer, the amount is preferably 15 parts by mass or more, more preferably 18 parts by mass or more per 100 parts by mass of the rubber component. The upper limit is not particularly critical and may be about 25 parts by mass or less. When the amount is within the range indicated above, more suitable effects can be obtained.

The sealant may further contain an inorganic filler such as carbon black, silica, calcium carbonate, calcium silicate, magnesium oxide, aluminum oxide, barium sulfate, talc, or mica, and/or a plasticizer such as an aromatic process oil, a naphthenic process oil, or a paraffinic process oil.

In the sealant used in the first sealant layer, the amount of the inorganic filler is preferably 40 parts by mass or less, more preferably 30 parts by mass or less per 100 parts by mass of the rubber component. The lower limit is not particularly critical and may be about 10 parts by mass or more. In the sealant used in the second sealant layer, the amount is preferably 40 parts by mass or more, more preferably 45 parts by mass or more per 100 parts by mass of the rubber component. The upper limit is not particularly critical and may be about 65 parts by mass or less. When the amount is within the range indicated above, more suitable effects can be obtained.

The inorganic filler is preferably carbon black to avoid degradation by UV rays. In the sealant used in the first sealant layer, the amount of the carbon black is preferably 40 parts by mass or less, more preferably 30 parts by mass or less per 100 parts by mass of the rubber component. The lower limit is not particularly critical and may be about 10 parts by mass or more. In the sealant used in the second sealant layer, the amount is preferably 40 parts by mass or more, more preferably 45 parts by mass or more per 100 parts by mass of the rubber component. The upper limit is not particularly critical and may be about 65 parts by mass or less. When the amount is within the range indicated above, more suitable effects can be obtained.

The amount of the plasticizer per 100 parts by mass of the rubber component is preferably 1 part by mass or more, more preferably 5 parts by mass or more. The sealant containing less than 1 part by mass of the plasticizer may have lower adhesion to tires and exhibit insufficient sealing performance. The amount is preferably 40 parts by mass or less, more preferably 20 parts by mass or less. The sealant containing more than 40 parts by mass of the plasticizer may be difficult to knead because it may slide in the kneading machine.

The sealant is preferably prepared by mixing a pelletized butyl-based rubber, a powdered crosslinking agent, and a powdered crosslinking activator, and more preferably by mixing a pelletized butyl-based rubber, a liquid polybutene, a plasticizer, carbon black powder, a powdered crosslinking agent, and a powdered crosslinking activator. Such raw materials can be suitably supplied to a continuous kneading machine to prepare a sealant with high productivity.

The sealant is preferably obtained by incorporating predetermined amounts of a liquid polymer, an organic peroxide (crosslinking agent), and a crosslinking activator with a rubber component including a butyl rubber.

When the sealant incorporates a butyl rubber with a liquid polymer (e.g. liquid polybutene), especially wherein the butyl rubber and the liquid polymer are each a combination of two or more materials having different viscosities, the sealant can achieve a balanced improvement of adhesion, sealing performance, fluidity, and processability. This is because the introduction of a liquid polymer component into an organic peroxide crosslinking system using a butyl rubber as the rubber component provides adhesion, and especially the use of liquid polymers or solid butyl rubbers having different viscosities reduces flowing of the sealant during high-speed running, as a result of which the sealant can achieve a balanced improvement of adhesion, sealing performance, fluidity, and processability.

The viscosities of the first sealant layer and the second sealant layer (the viscosities of the sealants of the first and second sealant layers) may be appropriately controlled.

As described earlier, the first sealant layer and the second sealant layer preferably have different viscosities from each other to ensure sealing performance from low to high temperatures. Since the temperature range where a sealant can make a seal depends on the viscosity of the sealant, the use of the first and second sealant layers having different viscosities provides sealing in a wider temperature range than when a single layer is used alone or when a stack of layers of the same composition is applied.

Moreover, the first sealant layer preferably has a lower viscosity than the second sealant layer in order to enable simultaneous achievement of sealing performance after running and sealing performance at low temperatures, which is difficult with conventional self-sealing tires, and also to obtain good initial sealing performance.

The first sealant layer preferably has a viscosity at 0° C. of lower than 35 kPa·s, more preferably not higher than 25 kPa·s, but preferably not lower than 5 kPa·s, more preferably not lower than 10 kPa·s. The first sealant layer preferably has a viscosity at 95° C. of lower than 6 kPa·s, more preferably not higher than 4 kPa·s, still more preferably not higher than 3 kPa·s, but preferably not lower than 1 kPa·s, more preferably not lower than 2 kPa·s. When each viscosity is within the range indicated above, more suitable effects can be obtained.

The second sealant layer preferably has a viscosity at 0° C. of not lower than 35 kPa·s, more preferably not lower than 40 kPa·s, still more preferably not lower than 50 kPa·s, but preferably not higher than 60 kPa·s, more preferably not higher than 55 kPa·s. The second sealant layer preferably has a viscosity at 95° C. of not lower than 6 kPa·s, but preferably not higher than 15 kPa·s, more preferably not higher than 10 kPa·s. When each viscosity is within the range indicated above, more suitable effects can be obtained.

The difference in viscosity at 0° C. between the first sealant layer and the second sealant layer (the value calculated by subtracting the viscosity at 0° C. of the first sealant layer from the viscosity at 0° C. of the second sealant layer) is preferably 1 kPa·s or larger, more preferably 10 kPa·s or larger, still more preferably 20 kPa·s or larger, but is preferably 55 kPa·s or smaller, more preferably 40 kPa·s or smaller, still more preferably 37 kPa·s or smaller.

The difference in viscosity at 95° C. between the first sealant layer and the second sealant layer (the value calculated by subtracting the viscosity at 95° C. of the first sealant layer from the viscosity at 95° C. of the second sealant layer) is preferably 0.1 kPa·s or larger, more preferably 2 kPa·s or larger, but is preferably 25 kPa·s or smaller, more preferably 15 kPa·s or smaller, still more preferably 12 kPa·s or smaller. When each difference is within the range indicated above, more suitable effects can be obtained.

As used herein, the viscosity of a sealant layer refers to the viscosity of a sealant forming the sealant layer, and is measured under the below-mentioned conditions to create a graph with measurement strain on the horizontal axis and shear viscosity on the vertical axis for each measurement temperature, where the maximum shear viscosity is defined as the viscosity at each temperature (0° C. or 95° C.).

Figure 10:
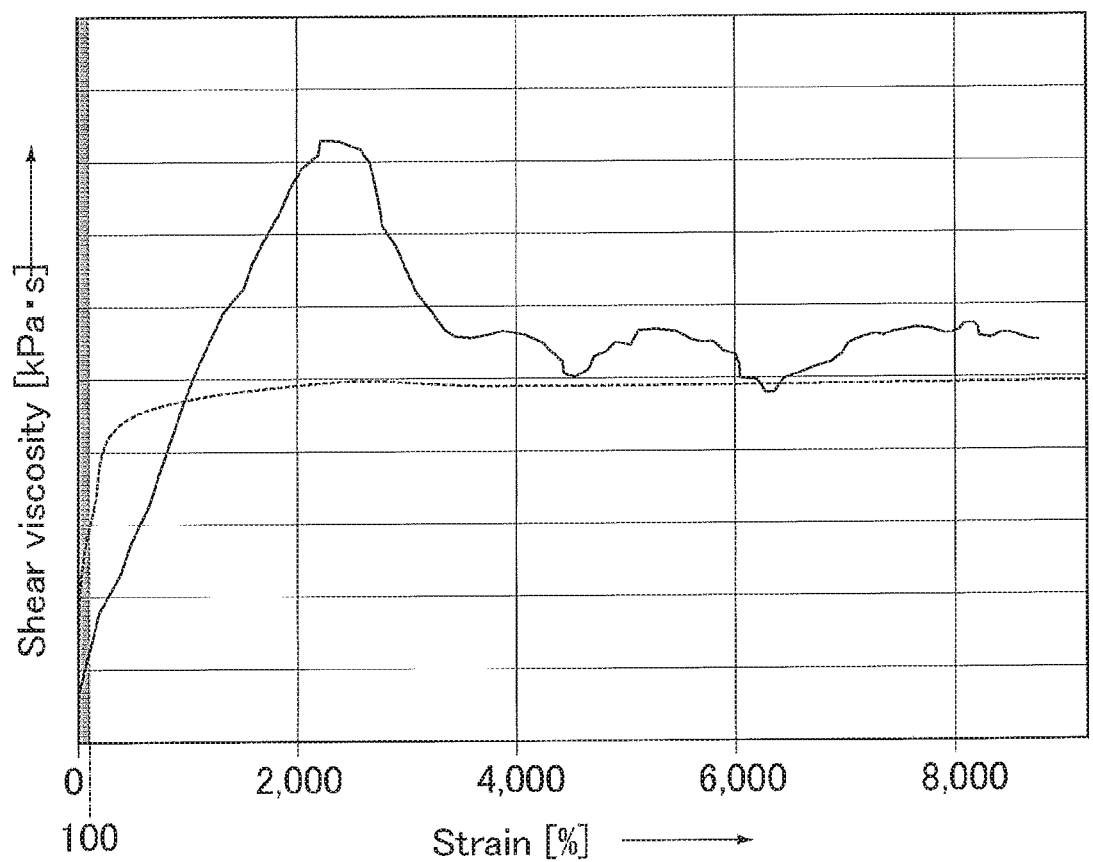
FIG. 10 schematically shows an example of a graph of measurements of the steady-flow shear viscosity of a sealant.

FIG. 10 schematically shows an example of a graph created by measuring the steady-flow shear viscosity of a sealant and plotting the measurement strain and shear, viscosity on the horizontal and vertical axes, respectively.

<Measurement Conditions>
Measurement device: twin-disc rotational rheometer MCR52 available from Anton Paar
Measurement mode: steady-flow shear viscosity
Measurement temperature: 0° C. or 95° C.
Preheating time: 1 minute after insertion between plates heated at a set temperature
Gap: 1 mm, distance between plates with no sealant extruded
Measurement time: 15 seconds
Measurement strain: 0 to 10,000%
Shear rate: 6 (1/s)
Rotor shape: circular plate (parallel plate type, disc diameter: 12 mm)

A self-sealing tire including a sealant layer located radially inside its innerliner may be produced by preparing a sealant by mixing the above-mentioned materials, followed by applying the sealant to an inner periphery of a tire, and preferably to a radially inner side of the innerliner. The materials of the sealant may be mixed using a known continuous kneading machine, for example. In particular, they are preferably mixed using a co-rotating or counter-rotating multi-screw kneading extruder, especially a twin screw kneading extruder.

The continuous kneading machine (especially twin screw kneading extruder) preferably has a plurality of supply ports for supplying raw materials, more preferably at least three supply ports, still more preferably at least three supply ports including upstream, midstream, and downstream supply ports. By sequentially supplying the raw materials to the continuous kneading machine (especially twin screw kneading extruder), the raw materials may be mixed and sequentially and continuously prepared into a sealant.

Preferably, the raw materials are sequentially supplied to the continuous kneading machine (especially twin screw kneading extruder), starting from the material having a higher viscosity. In this case, the materials can be sufficiently mixed and prepared into a sealant of a consistent quality.

Moreover, powdery materials, which improve kneadability, should desirably be introduced as upstream as possible.

The organic peroxide is preferably supplied to the continuous kneading machine (especially twin screw kneading extruder) from its downstream supply port. In this case, the time period from supplying the organic peroxide to applying the sealant to a tire can be shortened so that the sealant can be applied to a tire before it is cured. This permits more stable production of self-sealing tires.

Since kneading can be unsuccessfully accomplished when a large amount of the liquid polymer is introduced at once into the continuous kneading machine (especially twin screw kneading extruder), the liquid polymer is preferably supplied to the continuous kneading machine (especially twin screw kneading extruder) through a plurality of supply ports. In this case, the sealant can be more suitably kneaded.

When a continuous kneading machine (especially twin screw kneading extruder) is used, the sealant is preferably prepared using the continuous kneading machine (especially twin screw kneading extruder) having at least three supply ports by supplying a rubber component such as a butyl-based rubber, an inorganic filler, and a crosslinking activator each from the upstream supply port, a liquid polymer B from the midstream supply port, and a liquid polymer A, an organic peroxide, and a plasticizer each from the downstream supply port of the continuous kneading machine (especially twin screw kneading extruder), followed by kneading and extrusion. The materials such as liquid polymers may be entirely or partially supplied from the respective supply ports. Preferably, at least 95% by mass of the total amount of each material is supplied from the supply port.

Preferably, all the raw materials to be introduced into the continuous kneading machine are introduced into the continuous kneading machine under the control of a quantitative feeder. This permits continuous and automated preparation of the sealant.

Any feeder that can provide quantitative feeding may be used, including known feeders such as screw feeders, plunger pumps, gear pumps, and mohno pumps.

Solid raw materials (especially pellets or powder) such as butyl-based rubber pellets, carbon black powder, crosslinking agent powder, and crosslinking activator powder are preferably quantitatively supplied using a screw feeder. This allows the solid raw materials to be supplied precisely in fixed amounts, thereby permitting production of a higher quality sealant and therefore a higher quality self-sealing tire.

Moreover, the solid raw materials are preferably individually supplied through separate respective feeders. In this case, the raw materials need not to be blended beforehand, which facilitates supply of the materials in the mass production.

The plasticizer is preferably quantitatively supplied using a plunger pump. This allows the plasticizer to be supplied precisely in a fixed amount, thereby permitting production of a higher quality sealant and therefore a higher quality self-sealing tire.

The liquid polymer is preferably quantitatively supplied using a gear pump. This allows the liquid polymer to be supplied precisely in a fixed amount, thereby permitting production of a higher quality sealant and therefore a higher quality self-sealing tire.

The liquid polymer to be supplied is preferably kept under constant temperature control. The liquid polymer under constant temperature control can be supplied more precisely in a fixed amount. The temperature of the liquid polymer to be supplied is preferably 20 to 90° C., more preferably 40 to 70° C.

In view of easy mixing, extrudability, dispersibility, and crosslinking reaction, the mixing in the continuous kneading machine (especially twin screw kneading extruder) is preferably carried out at a barrel temperature of 30° C. (preferably 50° C.) to 150° C.

In view of sufficient mixing, preferably, the materials supplied upstream are mixed for 1 to 3 minutes, and the materials supplied midstream are mixed for 1 to 3 minutes, while the materials supplied downstream are preferably mixed for 0.5 to 2 minutes in order to avoid crosslinking. The times for mixing the materials each refer to the residence time in the continuous kneading machine (especially twin screw kneading extruder) from supply to discharge. For example, the time for mixing the materials supplied downstream means the residence time from when they are supplied through the downstream supply port until they are discharged.

The temperature of the sealant discharged from the outlet and therefore the rate of curing acceleration of the sealant may be controlled by varying the screw rotational speed of the continuous kneading machine (especially twin screw kneading extruder) or the setting of the temperature controller. As the screw rotational speed of the continuous kneading machine (especially twin screw kneading extruder) increases, kneadability and material temperature increase. The screw rotational speed does not affect the discharge amount. In view of sufficient mixing and control of the rate of curing acceleration, the screw rotational speed is preferably 50 to 700 (preferably 550) rpm.

In view of sufficient mixing and control of the rate of curing acceleration, the temperature of the sealant discharged from the outlet of the continuous kneading machine (especially twin screw kneading extruder) is preferably 70 to 150° C., more preferably 90 to 130° C. When the temperature of the sealant is within the range indicated above, the crosslinking reaction begins upon the application of the sealant and the sealant adheres well to an inner periphery of a tire while the crosslinking reaction more suitably proceeds 8o that a self-sealing tire having high sealing performance can be produced. Moreover, the crosslinking step described later is not necessary.

The amount of the sealant discharged from the outlet of the continuous kneading machine (especially twin screw kneading extruder) depends on the amounts of the raw materials supplied through the supply ports. The amounts of the raw materials supplied through the supply ports are not particularly critical, and a person skilled in the art may appropriately select the amounts.

To suitably produce a self-sealing tire having much better uniformity and sealing performance, preferably a substantially constant amount (discharge amount) of the sealant is discharged from the outlet.

Herein, the substantially constant discharge amount means that the variation of the discharge amount is within a range of 93 to 107%, preferably 97 to 103%, more preferably 98 to 102%, still more preferably 99 to 101%.

The outlet of the continuous kneading machine (especially twin screw kneading extruder) is preferably connected to a nozzle. Since the continuous kneading machine (especially twin screw kneading extruder) can discharge the materials at a high pressure, the prepared sealant may be attached in a thin, generally string shape (bead shape) to a tire by means of a nozzle (preferably a small diameter nozzle creating high resistance) mounted on the outlet. Specifically, by discharging the sealant from a nozzle connected to the outlet of the continuous kneading machine (especially twin screw kneading extruder) to sequentially apply it to an inner periphery of a tire, the applied sealant has a substantially constant thickness, thereby preventing deterioration of tire uniformity to produce a self-sealing tire excellent in weight balance.

Next, for example, the mixed sealant may be discharged from the nozzle connected to the outlet of the continuous kneading machine (especially twin screw kneading extruder) to feed and apply the sealant directly to an inner periphery of a vulcanized tire, thereby producing a self-sealing tire. In this case, since the sealant which has been mixed, e.g. in the twin screw kneading extruder and in which the crosslinking reaction in the extruder is suppressed is directly applied to a tire inner periphery, the crosslinking reaction of the sealant begins upon application and the sealant adheres well to the tire inner periphery while the crosslinking reaction suitably proceeds. Thus, the sealant applied to the tire inner periphery forms a sealant layer while suitably maintaining a generally string shape. Accordingly, it is possible to apply and process the sealant in a series of steps which further improves productivity. Moreover, since the sealant is applied to an inner periphery of a vulcanized tire, the productivity of self-sealing tires can be further enhanced. Furthermore, the sealant discharged from the nozzle connected to the outlet of the continuous kneading machine (especially twin screw kneading extruder) is preferably sequentially applied directly to the tire inner periphery. In this case, since the sealant in which the crosslinking reaction in the continuous kneading machine (especially twin screw kneading extruder) is suppressed is directly and continuously applied to the tire inner periphery, the crosslinking reaction of the sealant begins upon application and the sealant adheres well to the tire inner periphery while the crosslinking reaction suitably proceeds so that a self-sealing tire excellent in weight balance can be produced with higher productivity.

In the application of the sealant to an inner periphery of a tire, the sealant may be applied at least to a tire inner periphery that corresponds to a tread portion, and preferably at least to a tire inner periphery that corresponds to a breaker. Omitting the application of the sealant to areas where the sealant is unnecessary further enhances the productivity of self-sealing tires.

Figure 9:
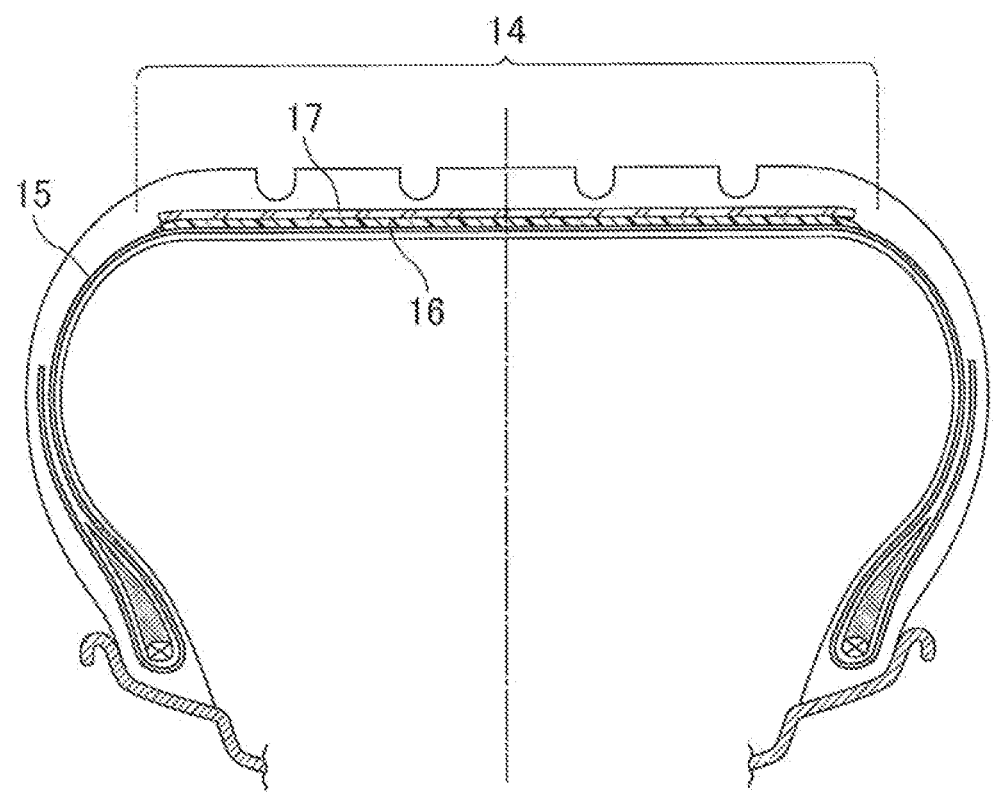
FIG. 9 is a schematic view illustrating an example of a cross-section of a pneumatic tire.

The term "tire inner periphery that corresponds to a tread portion" refers to an inner periphery of a tire that is located radially inside a tread portion which contacts the road surface. The term "tire inner periphery that corresponds to a breaker" refers to an inner periphery of a tire that is located radially inside a breaker. The term "breaker" refers to a component placed inside the tread and radially outside the carcass. Specifically, it is a component as shown as a breaker 16 in FIG. 9, for example.

Unvulcanized tires are usually vulcanized using bladders. During the vulcanization of the tires, the bladders inflate and closely attach to the inner periphery (innerliner) of the tires. Hence, mold release agents are usually applied to the inner periphery (innerliner) of the tires to avoid adhesion between the bladders and the inner periphery (innerliner) of the tires after completion of the vulcanization.

Water-soluble paints or mold-releasing rubbers are usually used as mold release agents. However, the presence of mold release agents on the tire inner periphery may impair adhesion between the sealant and the tire inner periphery. For this reason, it is preferred to previously remove any mold release agent from the tire inner periphery. In particular, it is more preferred to previously remove any mold release agent at least from a portion of the tire inner periphery in which application of the sealant starts, and still more preferably from the entire area of the tire inner periphery where the sealant is to be applied. In this case, the sealant adheres better to the tire inner periphery so that a self-sealing tire having higher sealing performance can be produced.

Mold release agents may be removed from the tire inner periphery by any method, including known methods such as buffing treatment, laser treatment, high pressure water washing, and removal with detergents and preferably with neutral detergents.

Figure 7:
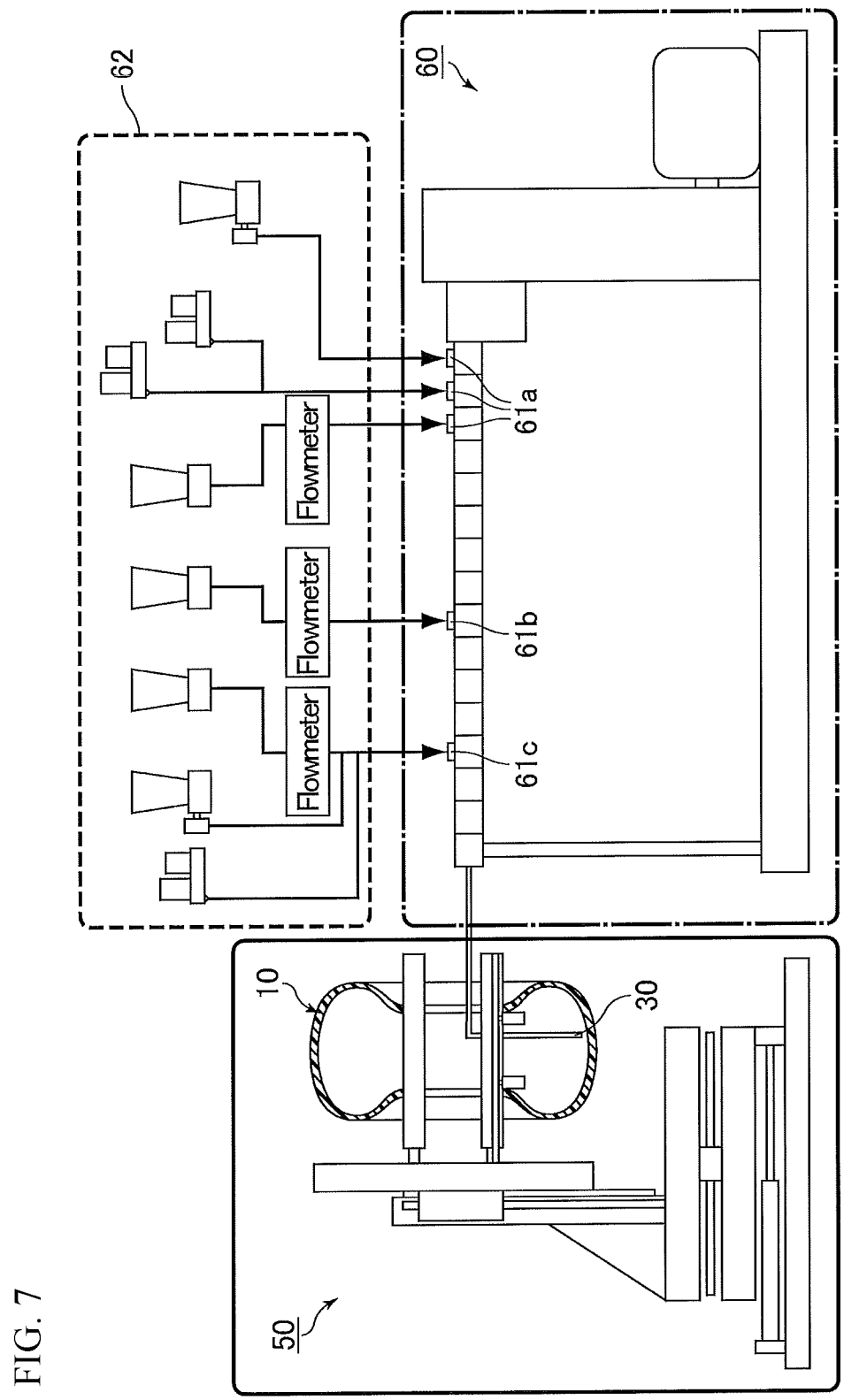
FIG. 7 is a schematic view illustrating an example of a production facility used in a method for producing a self-sealing tire.

An example of a production facility used in a method for producing a self-sealing tire will be briefly described below referring to FIG. 7.

The production facility includes a twin screw kneading extruder 60, a material feeder 62 for supplying raw materials to the twin screw kneading extruder 60, and a rotary drive device 50 which fixes and rotates a tire 10 while moving the tire in the width and radial directions of the tire. The twin screw kneading extruder 60 has five supply ports 61, specifically, including three upstream supply ports 61a, one midstream supply port 61b, and one downstream supply port 61c. Further, the outlet of the twin screw kneading extruder 60 is connected to a nozzle 30.

The raw materials may be sequentially supplied from the material feeder 62 to the twin screw kneading extruder 60 through the supply ports 61 of the twin screw kneading extruder 60 and then kneaded in the twin screw kneading extruder 60 to sequentially prepare a sealant. The prepared sealant may be continuously discharged from the nozzle 30 connected to the outlet of the twin screw kneading extruder 60. While the tire is being rotated by the tire drive device and simultaneously traversed and/or moved up and down (or moved in the width and/or radial direction of the tire), the sealant discharged from the nozzle 30 may be sequentially applied directly to an inner periphery of the tire, thereby continuously and spirally attaching the sealant to the tire inner periphery. In other words, the sealant may be continuously and spirally attached to an inner periphery of a tire by sequentially applying the sealant continuously discharged from the continuous kneading machine (especially twin screw kneading extruder) directly to the inner periphery of the tire while rotating the tire and simultaneously moving it in the width and/or radial direction of the tire.

Such a continuous and spiral attachment of the sealant to a tire inner periphery can prevent deterioration of tire uniformity to produce a self-sealing tire excellent in weight balance. Moreover, the continuous and spiral attachment of the sealant to a tire inner periphery results in formation of a sealant layer in which the sealant is uniformly provided in the circumferential and width directions of the tire, and especially in the circumferential direction of the tire. This permits stable production of self-sealing tires having excellent sealing performance with high productivity. The sealant is preferably attached without overlapping in the width direction and more preferably without gaps. In this case, the deterioration of tire uniformity can be further prevented and a more uniform sealant layer can be formed.

To obtain more suitable effects, the adjacent portions of the sealant of the first sealant layer are preferably in contact with each other. More preferably, they are attached without overlapping in the width direction and without gaps therebetween. For the same reason, the adjacent portions of the sealant of the second sealant layer are preferably in contact with each other, and more preferably attached without overlapping in the width direction and without gaps therebetween.

Moreover, the raw materials may be sequentially supplied to the continuous kneading machine (especially twin screw kneading extruder), by which a sealant may be sequentially prepared and then continuously discharged from the nozzle connected to the outlet of the continuous kneading machine (especially twin screw kneading extruder), to sequentially apply the sealant directly to a tire inner periphery. This permits production of self-sealing tires with high productivity.

The sealant layer is preferably formed by continuously and spirally applying a generally string-shaped sealant to an inner periphery of a tire. Thus, a sealant layer including a generally string-shaped sealant provided continuously and spirally along an inner periphery of a tire can be formed on the tire inner periphery.

The first sealant layer and the second sealant layer may be stacked by first spirally placing the first sealant layer and then spirally placing the second sealant layer on the first sealant layer such that it overlaps the first sealant layer.

This may be carried out by first spirally placing the first sealant layer and then spirally placing the second sealant layer such that it overlaps the first sealant layer but extends in a different direction from that of the first sealant layer, to obtain a structure in which the first sealant layer includes a generally string-shaped sealant provided continuously and spirally along an inner periphery of a tire, the second sealant layer includes a generally string-shaped sealant provided continuously and spirally along the first sealant layer, and the sealant of the first sealant layer and the sealant of the second sealant layer extend in directions crossing each other. Namely, the first sealant layer and the second sealant layer are preferably formed by continuously and spirally applying a generally string-shaped sealant in the same manner except that the direction along which the sealant extends is different from each other.

More specifically, for example, the pneumatic tire may be suitably produced in accordance with the application techniques described above or later by a method including: forming the first sealant layer by continuously and spirally applying a generally string-shaped sealant along an inner periphery of the tire; and forming the second sealant layer by continuously and spirally applying a generally string-shaped sealant along the first sealant layer such that the sealant of the first sealant layer and the sealant of the second sealant layer extend in directions crossing each other.

As used herein, the phrase "the sealant of the first sealant layer and the sealant of the second sealant layer extend in directions crossing each other" means that the direction (longitudinal direction) along which the sealant of the first sealant layer is applied intersects the direction (longitudinal direction) along which the sealant of the second sealant layer is applied.

Figure 12A:
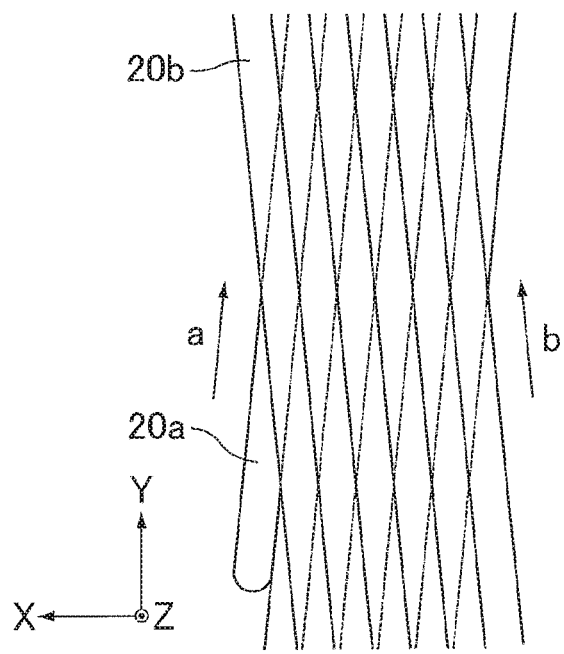
FIGS. 12A, 12B, and 12C are schematic views illustrating exemplary first and second sealant layers.
Figure 13F:
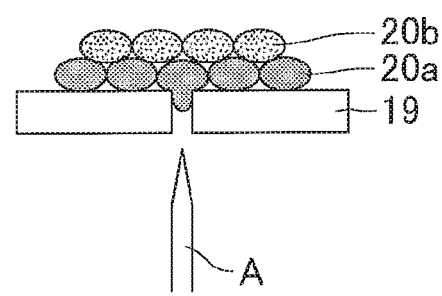

Specifically, it means that as shown in FIG. 12A, the direction along which the sealant 20a of the first sealant layer extends (the direction indicated by arrow a in the figure) is different from the direction along which the sealant 20b of the second sealant layer extends (the direction indicated by arrow b in the figure), so that the directions cross each other.

These directions refer to directions relative to the tire circumferential direction.

The direction along which the generally string-shaped sealant extends in each layer is preferably substantially constant. The term "substantially constant" means that the generally string-shaped sealant is applied (provided) at a substantially constant angle relative to the circumferential direction.

Herein, the phrase "the direction along which the generally string-shaped sealant extends is substantially constant" means that the variation of the angle of the applied sealant relative to the circumferential direction is within a range of 90 to 110%, preferably 95 to 105%, more preferably 98 to 102%, still more preferably 99 to 101%.

Figure 12B:
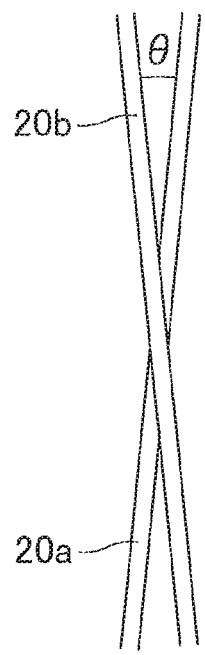

The angle θ (see FIG. 12B) at which the direction along which the sealant of the first sealant layer extends intersects the direction along which the sealant of the second sealant layer extends may be represented by the following equation (1): θ=arctan (the pitch width of the sealant of the first sealant layer/the inner perimeter of the tire)+arctan (the pitch width of the sealant of the second sealant layer/the inner perimeter of the tire).

Figure 12C:
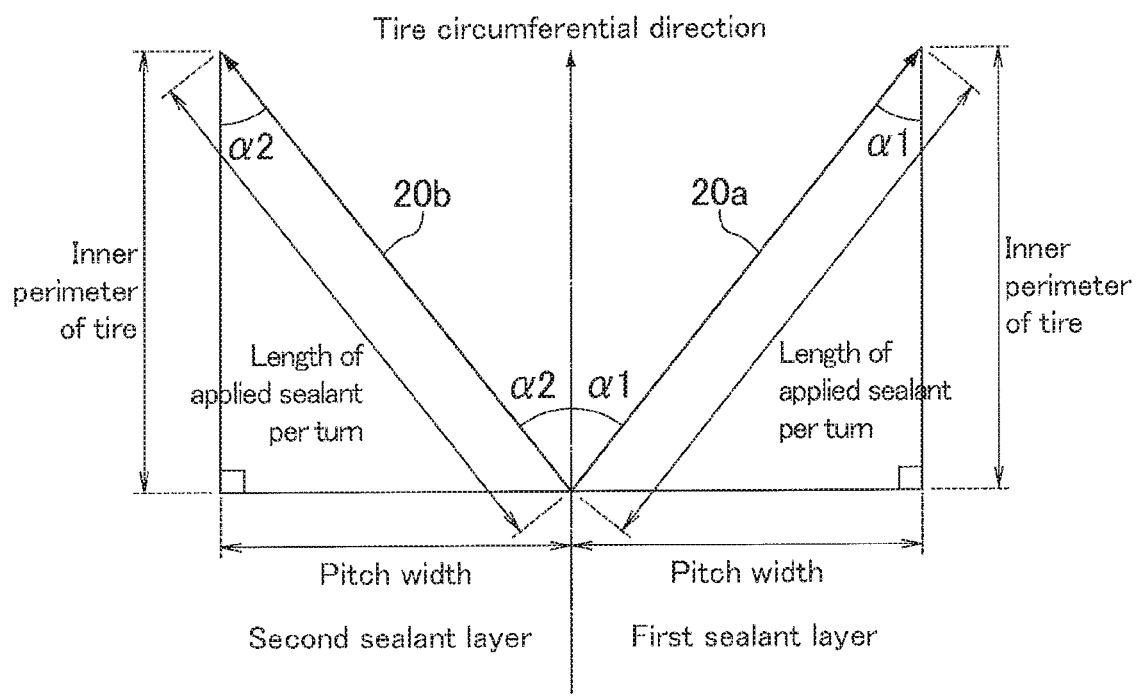

First, referring to FIG. 12C, the reason why the angle θ may be represented by equation (1) is described below.

The angle θ is a sum of an angle α1 of the sealant of the first sealant layer relative to the tire circumferential direction and an angle α2 of the sealant of the second sealant layer relative to the tire circumferential direction (θ=α1+α2).

Here, since tan α1=(the pitch width/the inner perimeter of the tire), α1=arctan (the pitch width/the inner perimeter of the tire). Similarly, since tan α2=(the pitch width/the inner perimeter of the tire), α2=arctan (the pitch width/the inner perimeter of the tire).

Thus, the following equation (1) is given: θ=α1+α2=arctan (the pitch width of the sealant of the first sealant layer/the inner perimeter of the tire)+arctan (the pitch width of the sealant of the second sealant layer/the inner perimeter of the tire).

Although the equations are calculated using "the inner perimeter of the tire" for both first and second sealant layers, the inner perimeter for the second sealant layer is strictly longer by the thickness of the first sealant layer. However, the difference is small enough to be ignored, and thus the equations are not wrong.

Preferably, the sealant of the first sealant layer and the sealant of the second sealant layer both have a pitch width of 2 mm to 5 mm, and the sealant of the first sealant layer and the sealant of the second sealant layer extend in directions crossing each other at an angle θ satisfying equation (1). In this case, more suitable effects can be obtained. The pitch width is preferably 2.5 mm or more, but preferably 4 mm or less, more preferably 3.5 mm or less.

The term "pitch width" as used herein refers to the length by which the application position shifts in the tire width direction per turn of the spiral. More specifically, it refers to the length by which the application position shifts in the tire width direction while one turn of the sealant is wound around the tire inner periphery, i.e. during one rotation of the tire, and it is a length indicated by T in FIG. 8. The application position refers to the middle of the attached sealant when seen in the tire width direction.

Preferably, the sealants of the first and second sealant layers both have a width equal to or larger than the pitch width thereof. In this case, the adjacent portions of the sealant are in contact with each other in both first and second sealant layers, and thus more suitable effects can be obtained.

The angle θ at which the direction along which the sealant of the first sealant layer extends intersects the direction along which the sealant of the second sealant layer extends is preferably 0.050° or larger, more preferably 0.100° or larger, still more preferably 0.150° or larger, but is preferably 0.400° or smaller, more preferably 0.300° or smaller, still more preferably 0.200° or smaller. When the angle is within the range indicated above, more suitable effects can be obtained.

The angle α1 of the sealant of the first sealant layer relative to the tire circumferential direction and the angle α2 of the sealant of the second sealant layer relative to the tire circumferential direction are not particularly critical as long as they satisfy the angle θ. The angles α1 and α2 are the same or different and are each preferably 0.025° or larger, more preferably 0.050° or larger, still more preferably 0.0750 or larger, but preferably 0.200° or smaller, more preferably 0.150° or smaller, still more preferably 0.100° or smaller. When the angles are each within the range indicated above, more suitable effects can be obtained.

The angle α1 of the sealant of the first sealant layer relative to the tire circumferential direction is preferably equal to the angle α2 of the sealant of the second sealant layer relative to the tire circumferential direction.

The first sealant layer and the second sealant layer preferably have different thicknesses from each other. In this case, for example, when the second sealant layer (the sealant used in the second sealant layer) is thicker than the first sealant layer (the sealant used in the first sealant layer), sealing performance after running can be further improved. Conversely, when the first sealant layer (the sealant used in the first sealant layer) is thicker than the second sealant layer (the sealant used in the second sealant layer), sealing performance at low temperatures can be further improved. Thus, properties appropriate for the service conditions can be imparted to the sealant layer.

The thickness of the first sealant layer (the sealant used in the first sealant layer) is preferably 1 mm or more, more preferably 1.3 mm or more, still more preferably 2 mm or more, particularly preferably 3 mm or more, but is preferably 5 mm or less, more preferably 4 mm or less.

The thickness of the second sealant layer (the sealant used in the second sealant layer) is preferably 1 mm or more, more preferably 1.3 mm or more, still more preferably 2 mm or more, particularly preferably 3 mm or more, but is preferably 5 mm or less, more preferably 4 mm or less.

The combined thickness of the first and second sealant layers is preferably 7 mm or less, more preferably 6 mm or less, but is preferably 3 mm or more, more preferably 4 mm or more.

When each thickness is within the range indicated above, more suitable effects can be obtained.

When seen in the radial direction from the inside to the outside of the tire, the proportion of the area where the direction along which the sealant of the first sealant layer extends and the direction along which the sealant of the second sealant layer extends cross each other (hereinafter, also referred to as the proportion of the crossed area) relative to the total area where both the first sealant layer and the second sealant layer are present, i.e. where the first sealant layer overlaps the second sealant layer, is preferably 60% or more, more preferably 70% or more, still more preferably 80% or more, particularly preferably 90% or more, most preferably 95% or more, further most preferably 98% or more, still further most preferably 100%.

Figure 4:
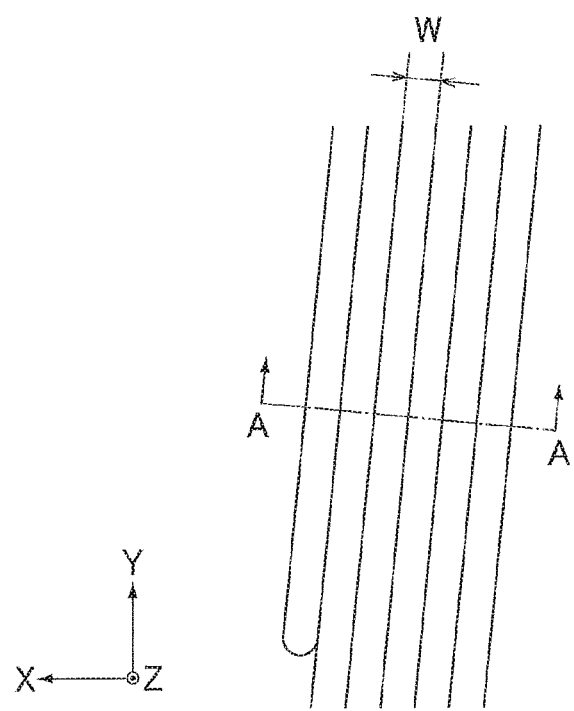
FIG. 4 is a schematic view illustrating an example of a generally string-shaped sealant continuously and spirally attached to an inner periphery of a tire.

The number of turns of the sealant around the inner periphery of the tire is preferably 20 to 70, more preferably 20 to 60, still more preferably 35 to 50, because then the deterioration of tire uniformity can be prevented and a self-sealing tire having an excellent weight balance and good sealing performance can be produced with higher productivity. Here, two turns means that the sealant is applied such that it makes two laps around the inner periphery of the tire. In FIG. 4, the number of turns of the sealant is six.

The use of a continuous kneading machine (especially twin screw kneading extruder) enables the preparation (kneading) of a sealant and the discharge (application) of the sealant to be simultaneously and continuously performed. This allows a highly viscous and adhesive sealant which is difficult to handle to be directly applied to an inner periphery of a tire without being handled, thereby permitting production of self-sealing tires with high productivity. If a sealant is prepared by kneading with a curing agent in a batch kneading machine, the time period from preparing a sealant to attaching the sealant to a tire is not constant. In contrast, by sequentially preparing a sealant by mixing raw materials including an organic peroxide using a continuous kneading machine (especially twin screw kneading extruder), followed by sequentially applying the sealant to an inner periphery of a tire, the time period from preparing a sealant to attaching the sealant to a tire is held constant. In this case, when the sealant is applied through a nozzle, the amount of the sealant discharged from the nozzle is stable; moreover, the sealant shows consistent adhesion while reducing the deterioration of adhesion to the tire, and even a highly viscous and adhesive sealant which is difficult to handle can be precisely applied to a tire inner periphery, thereby permitting stable production of self-sealing tires of a consistent quality.

The following describes methods for applying a sealant to an inner periphery of a tire.

First Embodiment

A first embodiment of a self-sealing tire may be produced, for example, by performing the steps (1), (2), and (3) below in the process of applying an adhesive sealant through a nozzle to an inner periphery of a tire while rotating the tire and simultaneously moving the tire and/or nozzle in the width direction of the tire: step (1) of measuring the distance between the inner periphery of the tire and the tip of the nozzle using a non-contact displacement sensor; step (2) of moving the tire and/or nozzle in the radial direction of the tire according to the data to adjust the distance between the inner periphery of the tire and the tip of the nozzle to a predetermined length; and step (3) of applying the sealant to the inner periphery of the tire at the adjusted distance.

The distance between the inner periphery of the tire and the tip of the nozzle may be maintained at a constant length by measuring the distance between the inner periphery of the tire and the tip of the nozzle using a non-contact displacement sensor and feeding back the data. Moreover, since the sealant is applied to the tire inner periphery while maintaining the distance at a constant length, the applied sealant has a uniform thickness without being affected by variations in tire shape and irregularities at joint or other portions. Furthermore, since it is not necessary to enter the coordinate data of each tire having a different size as in the conventional art, the sealant can be efficiently applied.

Figure 1:
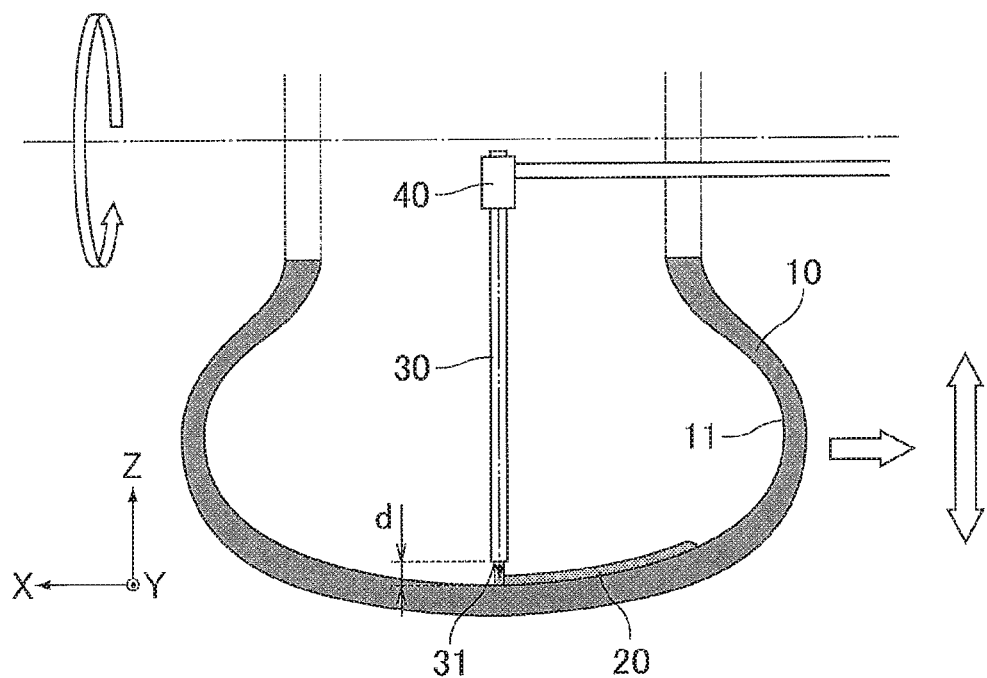
FIG. 1 is a schematic view illustrating an example of an applicator used in a method for producing a self-sealing tire.
Figure 2:
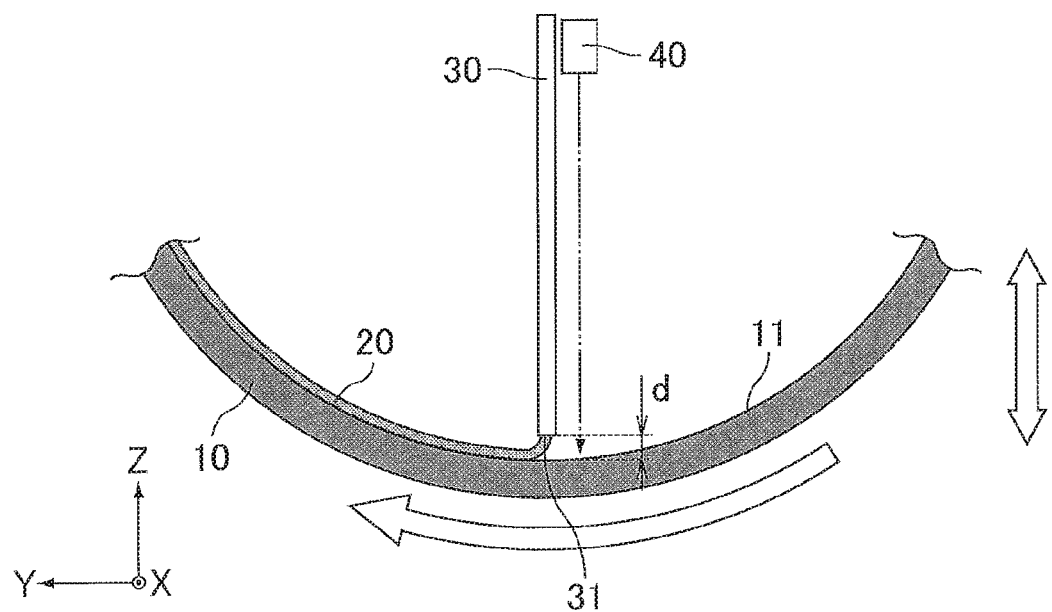
FIG. 2 is an enlarged illustration of the vicinity of the tip of the nozzle in the applicator shown in FIG. 1.

FIG. 1 is a schematic view illustrating an example of an applicator used in a method for producing a self-sealing tire, and FIG. 2 is an enlarged illustration of the vicinity of the tip of the nozzle in the applicator shown in FIG. 1.

FIG. 1 shows a cross-section of a part of a tire 10 in the meridional direction (a cross-section taken along a plane including the width and radial directions of the tire). FIG. 2 shows a cross-section of a part of the tire 10 taken along a plane including the circumferential and radial directions of the tire. In FIGS. 1 and 2, the width direction (axis direction) of the tire is indicated by arrow X, the circumferential direction of the tire is indicated by arrow Y, and the radial direction of the tire is indicated by arrow Z.

The tire 10 is mounted on a rotary drive device (not shown) which fixes and rotates the tire while moving the tire in the width and radial directions of the tire. The rotary drive device permits the following independent operations: rotation around the axis of the tire, movement in the width direction of the tire, and movement in the radial direction of the tire.

The rotary drive device includes a controller (not shown) capable of controlling the amount of movement in the tire radial direction. The controller may be capable of controlling the amount of movement in the tire width direction and/or the rotational speed of the tire.

A nozzle 30 is attached to the tip of an extruder (not shown) and can be inserted into the inside of the tire 10. Then an adhesive sealant 20 extruded from the extruder is discharged from the tip 31 of the nozzle 30.

A non-contact displacement sensor 40 is attached to the nozzle 30 to measure the distance d between the inner periphery 11 of the tire 10 and the tip 31 of the nozzle 30.

Thus, the distance d to be measured by the non-contact displacement sensor is the distance in the tire radial direction between the inner periphery of the tire and the tip of the nozzle.

According to the method for producing a self-sealing tire of this embodiment, the tire 10 formed through a vulcanization step is first mounted on the rotary drive device, and the nozzle 30 is inserted into the inside of the tire 10. Then, as shown in FIGS. 1 and 2, the tire 10 is rotated and simultaneously moved in the width direction while the sealant 20 is discharged from the nozzle 30, thereby continuously applying the sealant to the inner periphery 11 of the tire 10. The tire 10 is moved in the width direction according to the pre-entered profile of the inner periphery 11 of the tire 10.

The sealant 20 preferably has a generally string shape, as described later. More specifically, the sealant preferably maintains a generally string shape when it is applied to the inner periphery of the tire. In this case, the generally string-shaped sealant 20 is continuously and spirally attached to the inner periphery 11 of the tire 10.

Figure 8:
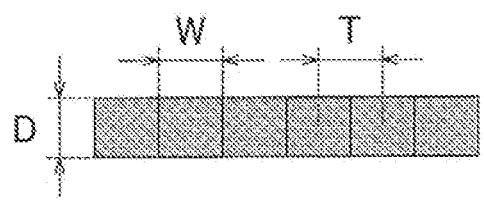
FIG. 8 is a schematic view illustrating an example of a cross-section of the sealant of FIG. 4 cut along the A-A straight line orthogonal to the direction (longitudinal direction) along which the sealant is applied.

The term "generally string shape" as used herein refers to a shape having a certain width, a certain thickness, and a length longer than the width. FIG. 4 schematically shows an example of a generally string-shaped sealant continuously and spirally attached to an inner periphery of a tire, and FIG. 8 schematically shows an example of a cross-section of the sealant of FIG. 4 cut along the A-A straight line orthogonal to the direction (longitudinal direction) along which the sealant is applied. Thus, the generally string-shaped sealant has a certain width (length indicated by W in FIG. 8) and a certain thickness (length indicated by D in FIG. 8). The width of the sealant means the width of the applied sealant. The thickness of the sealant means the thickness of the applied sealant, more specifically the thickness of the sealant layer.

Specifically, the generally string-shaped sealant is a sealant having a thickness (thickness of the applied sealant or the sealant layer, length indicated by D in FIG. 8) satisfying a preferable numerical range and a width (width of the applied sealant, length indicated by W in FIG. 4 or $W_0$ in FIG. 6) satisfying a preferable numerical range as described later, and more preferably a sealant having a ratio of the thickness to the width of the sealant [(thickness of sealant)/(width of sealant)] satisfying a preferable numerical range as described later. The generally string-shaped sealant is also a sealant having a cross-sectional area satisfying a preferable numerical range as described later.

According to the method for producing a self-sealing tire of this embodiment, the sealant is applied to an inner periphery of a tire by the following steps (1) to (3).

<Step (1)>

As shown in FIG. 2, the distance d between the inner periphery 11 of the tire 10 and the tip 31 of the nozzle 30 before the application of the sealant 20 is measured with the non-contact displacement sensor 40. The measurement of the distance d is performed upon every application of the sealant 20 to the inner periphery 11 of each tire 10, and from the start to the end of application of the sealant 20.

<Step (2)>

The distance d data is transmitted to the controller of the rotary drive device. According to the data, the controller controls the amount of movement in the tire radial direction so that the distance between the inner periphery 11 of the tire 10 and the tip 31 of the nozzle 30 is adjusted to a predetermined length.

<Step (3)>

Since the sealant 20 is continuously discharged from the tip 31 of the nozzle 30, it is then applied to the inner periphery 11 of the tire 10 at the adjusted distance. Through the steps (1) to (3), the sealant 20 having a uniform thickness can be applied to the inner periphery 11 of the tire 10.

Figure 3:
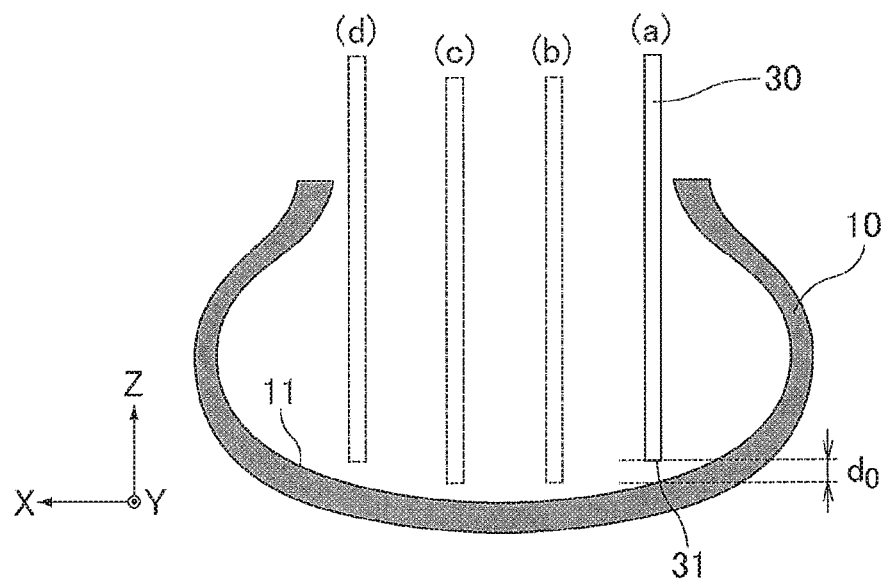
FIG. 3 is a schematic view illustrating the positional relationship of the nozzle to a tire.

FIG. 3 is a schematic view illustrating the positional relationship of the nozzle to the tire.

As shown in FIG. 3, the sealant may be applied while maintaining the distance between the inner periphery 11 of the tire 10 and the tip 31 of the nozzle 30 at a predetermined distance ($d_0$) during the movement of the nozzle 30 to positions (a) to (d) relative to the tire 10.

To obtain more suitable effects, the adjusted distance $d_0$ is preferably 0.3 mm or more, more preferably 1.0 mm or more. When the distance is less than 0.3 mm, the tip of the nozzle is too close to the inner periphery of the tire, which makes it difficult to allow the applied sealant to have a predetermined thickness. The adjusted distance $d_0$ is also preferably 3.0 mm or less, more preferably 2.0 mm or less. When the distance is more than 3.0 mm, the sealant may not be attached well to the tire, thereby resulting in reduced production efficiency.

The adjusted distance $d_0$ refers to the distance in the tire radial direction between the inner periphery of the tire and the tip of the nozzle after it is adjusted in step (2).

To obtain more suitable effects, the adjusted distance $d_0$ is preferably 30% or less, more preferably 20% or less of the thickness of the applied sealant. The adjusted distance $d_0$ is also preferably 5% or more, more preferably 10% or more of the thickness of the applied sealant.

The thickness of the sealant (the thickness of the applied sealant or the sealant layer, length indicated by D in FIG. 8) is not particularly critical. In order to obtain more suitable effects, the thickness of the sealant is preferably 1.0 mm or more, more preferably 1.5 mm or more, still more preferably 2.0 mm or more, particularly preferably 2.5 mm or more, but is preferably 10.0 mm or less, more preferably 8.0 mm or less, still more preferably 5.0 mm or less. When the thickness is less than 1.0 mm, a puncture hole, if formed in the tire, is difficult to reliably seal. Also, a thickness of more than 10.0 mm is not preferred because the tire weight increases, although with little improvement in the effect of sealing puncture holes. The thickness of the sealant may be controlled by varying the rotational speed of the tire, the velocity of movement in the tire width direction, the distance between the tip of the nozzle and the inner periphery of the tire, or other factors.

The thickness of the sealant (the thickness of the applied sealant or the sealant layer) is preferably substantially constant. In this case, the deterioration of tire uniformity can be further prevented to produce a self-sealing tire having a much better weight balance.

Herein, the substantially constant thickness means that the variation of the thickness is within a range of 90 to 110%, preferably 95 to 105%, more preferably 98 to 102%, still more preferably 99 to 101%.

In order to reduce clogging of the nozzle so that excellent operational stability can be obtained and to obtain more suitable effects, a generally string-shaped sealant is preferably used and more preferably spirally attached to the inner periphery of the tire. However, a sealant not having a generally string shape may also be used and applied by spraying onto the tire inner periphery.

In the case of a generally string-shaped sealant, the width of the sealant (the width of the applied sealant, length indicated by W in FIG. 4) is not particularly critical. In order to obtain more suitable effects, the width of the sealant is preferably 0.8 mm or more, more preferably 1.3 mm or more, still more preferably 1.5 mm or more. When the width is less than 0.8 mm, the number of turns of the sealant around the tire inner periphery may increase, reducing production efficiency. The width of the sealant is also preferably 18 mm or less, more preferably 13 mm or less, still more preferably 9.0 mm or less, particularly preferably 7.0 mm or less, most preferably 6.0 mm or less, even most preferably 5.0 mm or less. When the width is more than 18 mm, a weight imbalance may be more likely to occur.

The ratio of the thickness of the sealant (the thickness of the applied sealant or the sealant layer, length indicated by D in FIG. 8) to the width of the sealant (the width of the applied sealant, length indicated by W in FIG. 4) [(thickness of sealant)/(width of sealant)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape which permits production of a self-sealing tire having high sealing performance with higher productivity.

To obtain more suitable effects, the cross-sectional area of the sealant (the cross-sectional area of the applied sealant, area calculated by D×W in FIG. 8) is preferably 0.8 $mm^2$ or more, more preferably 1.95 $mm^2$ or more, still more preferably 3.0 $mm^2$ or more, particularly preferably 3.75 $mm^2$ or more, but is preferably 180 $mm^2$ or less, more preferably 104 $mm^2$ or less, still more preferably 45 $mm^2$ or less, particularly preferably 35 $mm^2$ or less, most preferably 25 $mm^2$ or less.

The width of the area where the sealant is attached (hereinafter also referred to as the width of the attachment area or the width of the sealant layer, and corresponding to a length equal to 6×W in FIG. 4 or a length equal to $W_1+6×W_0$ in FIG. 6) is not particularly critical. In order to obtain more suitable effects, the width is preferably 80% or more, more preferably 90% or more, still more preferably 100% or more, but preferably 120% or less, more preferably 110% or less, of the tread contact width.

To obtain more suitable effects, the width of the sealant layer is preferably 85 to 115%, more preferably 95 to 105% of the width of the breaker of the tire (the length of the breaker in the tire width direction).

Herein, when the tire includes a plurality of breakers, the length of the breaker in the tire width direction refers to the length in the tire width direction of the breaker that is the longest in the tire width direction, among the plurality of breakers.

Herein, the tread contact width is defined as follows. First, a no-load and normal condition tire with a normal internal pressure mounted on a normal rim is contacted with a plane at a camber angle of 0 degrees while a normal load is applied to the tire, and then the axially outermost contact positions of the tire are each defined as "contact edge Te". The distance between the contact edges Te and Te in the tire axis direction is defined as the tread contact width TW. The dimensions and other characteristics of tire components are determined under the above normal conditions, unless otherwise stated.

The "normal rim" refers to a rim specified for each tire by the standards in a standard system including standards according to which tires are provided, and may be "standard rim" in JATMA, "design rim" in TRA, or "measuring rim" in ETRTO. The "normal internal pressure" refers to an air pressure specified for each tire by the standards in a standard system including standards according to which tires are provided, and may be "maximum air pressure" in JATMA, a maximum value shown in Table "TIRE LOAD LIMITS AT VARIOUS COLD INFLATION PRESSURES" in TRA, or "inflation pressure" in ETRTO. In the case of tires for passenger vehicles, the normal internal pressure is 180 kPa.

The "normal load" refers to a load specified for each tire by the standards in a standard system including standards according to which tires are provided, and may be "maximum load capacity" in JATMA, a maximum value shown in Table "TIRE LOAD LIMITS AT VARIOUS COLD INFLATION PRESSURES" in TRA, or "load capacity" in ETRTO. In the case of tires for passenger vehicles, the normal load is 88% of the above-specified load.

The rotational speed of the tire during the application of the sealant is not particularly critical. In order to obtain more suitable effects, the rotational speed is preferably 5 m/min or higher, more preferably 10 m/min or higher, but is preferably 30 m/min or lower, more preferably 20 m/min or lower. When the rotational speed is lower than 5 m/min or higher than 30 m/min, a sealant having a uniform thickness cannot be easily applied.

When a non-contact displacement sensor is used, the risk of troubles caused by adhesion of the sealant to the sensor can be reduced. The non-contact displacement sensor used is not particularly limited as long as it can measure the distance between the inner periphery of the tire and the tip of the nozzle. Examples include laser sensors, photosensors, and capacitance sensors. These sensors may be used alone or in combinations of two or more. For measurement of rubber, laser sensors or photosensors are preferred among these, with laser sensors being more preferred. When a laser sensor is used, the distance between the inner periphery of the tire and the tip of the nozzle may be determined as follows: the inner periphery of the tire is irradiated with a laser; the distance between the inner periphery of the tire and the tip of the laser sensor is determined based on the reflection of the laser; and the distance between the tip of the laser sensor and the tip of the nozzle is subtracted from the determined distance.

The location of the non-contact displacement sensor is not particularly limited as long as it allows the distance between the inner periphery of the tire and the tip of the nozzle before the application of the sealant to be measured. The sensor is preferably attached to the nozzle, more preferably in a location to which the sealant will not adhere.

The number, size, and other conditions of the non-contact displacement sensor are also not particularly limited.

Since the non-contact displacement sensor is vulnerable to heat, the sensor is preferably protected, e.g. with a heat insulator and/or cooled, e.g. with air, to avoid the influence of heat from the hot sealant discharged from the nozzle. This improves the durability of the sensor.

Although the first embodiment has been described based on examples in which the tire, not the nozzle, is moved in the width and radial directions of the tire, the nozzle, not the tire, may be moved, or both the tire and the nozzle may be moved.

The rotary drive device preferably includes a means to increase the width of a tire at a bead portion. In the application of the sealant to a tire, increasing the width of the tire at a bead portion allows the sealant to be easily applied to the tire. Particularly when the nozzle is to be introduced near the inner periphery of the tire mounted on the rotary drive device, the nozzle may be introduced only by parallel movement of the nozzle, which facilitates the control and improves productivity.

Any means that can increase the width of a tire at a bead portion can be used as the means to increase the width of a tire at a bead portion. Examples include a mechanism in which two devices each having a plurality of (preferably two) rolls which have a fixed positional relationship with each other are used, and the devices move in the tire width direction. The devices may be inserted from both sides through the opening of a tire into the inside of the tire and allowed to increase the width of the tire at a bead portion.

In the production method, since the sealant which has been mixed in, for example, a twin screw kneading extruder and in which the crosslinking reaction in the extruder is suppressed is directly applied to the tire inner periphery, the crosslinking reaction begins upon application and the sealant adheres well to the tire inner periphery while the crosslinking reaction more suitably proceeds so that a self-sealing tire having high sealing performance can be produced. Thus, the self-sealing tire with the sealant applied thereto does not need further crosslinking, thereby offering good productivity.

The self-sealing tire with the sealant applied thereto may be further subjected to a crosslinking step, if necessary.

The self-sealing tire is preferably heated in the crosslinking step. This improves the rate of crosslinking of the sealant and allows the crosslinking reaction to more suitably proceed so that the productivity of self-sealing tires can be further enhanced. The tire may be heated by any method, including known methods, but it may suitably be heated in an oven. The crosslinking step may be carried out, for example, by placing the self-sealing tire in an oven at 70 to 190° C., preferably 150 to 190° C., for 2 to 15 minutes.

The tire is preferably rotated in the circumferential direction of the tire during the crosslinking because then flowing of even the just-applied, easily flowing sealant can be prevented and the crosslinking reaction can be accomplished without deterioration of uniformity. The rotational speed is preferably 300 to 1,000 rpm. More specifically, the oven used may be, for example, an oven equipped with a rotational mechanism.

Even when the crosslinking step is not additionally performed, the tire is preferably rotated in the circumferential direction of the tire until the crosslinking reaction of the sealant is completed. In this case, flowing of even the just-applied, easily flowing sealant can be prevented and the crosslinking reaction can be accomplished without deterioration of uniformity. The rotational speed is the same as described for the crosslinking step.

To improve the rate of crosslinking of the sealant, the tire is preferably previously warmed before the application of the sealant. This permits production of self-sealing tires with higher productivity. The temperature for pre-heating the tire is preferably 40 to 100° C., more preferably 50 to 70° C. When the tire is pre-heated within the above temperature range, the crosslinking reaction suitably begins upon application and more suitably proceeds so that a self-sealing tire having high sealing performance can be produced. Moreover, when the tire is pre-heated within the above temperature range, the crosslinking step is not necessary and thus the productivity of self-sealing tires can be enhanced.

In general, continuous kneading machines (especially twin screw kneading extruders) are continuously operated. In the production of self-sealing tires, however, tires need to be replaced one after another upon completion of the application of the sealant to one tire. Here, in order to produce higher quality self-sealing tires while reducing deterioration of productivity, the following method (1) or (2) may be used. The method (1) or (2) may be appropriately selected depending on the situation and in view of the following disadvantages: deterioration in quality in method (1) and an increase in cost in method (2).

(1) The feed of the sealant to the inner periphery of the tire is controlled by running or stopping the continuous kneading machine and all the feeders simultaneously.

More specifically, upon completion of the application to one tire, the continuous kneading machine and all the feeders may be simultaneously stopped to replace the tire with another tire, preferably within one minute, and then the continuous kneading machine and all the feeders may be simultaneously allowed to run to restart the application to the tire. By replacing tires quickly, preferably within one minute, the deterioration in quality can be reduced.

(2) The feed of the sealant to the inner periphery of the tire is controlled by switching flow channels while allowing the continuous kneading machine and all the feeders to keep running.

More specifically, the continuous kneading machine may be provided with another flow channel in addition to the nozzle for direct feeding to the tire inner periphery, and the prepared sealant may be discharged from the another flow channel after completion of the application to one tire until completion of the replacement of tires. Since the continuous kneading machine and all the feeders are kept running during the production of self-sealing tires, this method can produce self-sealing tires having higher quality.

Non-limiting examples of carcass cords that can be used in the carcass of the above-described self-sealing tire include fiber cords and steel cords. Steel cords are preferred among these. In particular, steel cords formed of hard steel wire materials specified in JIS G 3506 are desirable. The use of strong steel cords, instead of commonly used fiber cords, as carcass cords in the self-sealing tire greatly improves side cut resistance (resistance to cuts in the tire side portions due to driving over curbs or other reasons), thereby further improving puncture resistance of the entire tire including the side portions.

The steel cords may have any structure. Examples include steel cords having a 1×n single strand structure, steel cords having a k+m layered strand structure, steel cords having a 1×n bundle structure, and steel cords having an m×n multi-strand structure. The term "steel cord having a 1×n single strand structure" refers to a single-layered twisted steel cord formed by intertwining n filaments. The term "steel cord having a k+m layered strand structure" refers to a steel cord having a two-layered structure in which the two layers are different from each other in twist direction and twist pitch, and the inner layer includes k filaments while the outer layer includes m filaments. The term "steel cord having a 1×n bundle structure" refers to a bundle steel cord formed by intertwining bundles of n filaments. The term "steel cord having an m×n multi-strand structure" refers to a multi-strand steel cord formed by intertwining m strands produced by first twisting n filaments together. Here, n represents an integer of 1 to 27; k represents an integer of 1 to 10; and m represents an integer of 1 to 3.

The twist pitch of the steel cords is preferably 13 mm or less, more preferably 11 mm or less, but is preferably 5 mm or more, more preferably 7 mm or more.

The steel cords preferably each contain at least one preformed filament formed in the shape of a spiral. The inclusion of such a preformed filament provides a relatively large gap within the steel cord to improve rubber permeability, and further can maintain the elongation under low load so that a molding failure can be prevented during vulcanization.

The surface of the steel cords is preferably plated with brass, Zn, or other materials to improve initial adhesion to the rubber composition.

The steel cords preferably have an elongation under a load of 50 N of 0.5 to 1.5%. When the elongation under a load of 50 N is more than 1.5%, the reinforcing cords may exhibit reduced elongation under high load, thereby failing to maintain disturbance absorption. Conversely, when the elongation under a load of 50 N is less than 0.5%, the cords may not show sufficient elongation during vulcanization, thereby resulting in a molding failure. In view of the above, the elongation under a load of 50 N is more preferably 0.7% or more, but is more preferably 1.3% or less.

The endcount of the steel cords is preferably 20 to 50 (ends/5 cm).

Second Embodiment

The studies of the present inventor have revealed that the use of the method according to the first embodiment alone has the following disadvantage: a sealant having a generally string shape is occasionally difficult to attach to the inner periphery of a tire and can easily peel off particularly at the attachment start portion. A second embodiment is characterized in that in the method for producing a self-sealing tire described above, the sealant is attached under conditions where the distance between the inner periphery of the tire and the tip of the nozzle is adjusted to a distance $d_1$ and then to a distance $d_2$ larger than the distance di. In this case, since the distance between the inner periphery of the tire and the tip of the nozzle is shortened at the beginning of the attachment, the width of the sealant corresponding to the attachment start portion is increased. Accordingly, a self-sealing tire can be easily produced in which a generally string-shaped adhesive sealant is continuously and spirally attached at least to an inner periphery of the tire that corresponds to a tread portion, and at least one of the longitudinal ends of the sealant forms a wider portion having a width larger than that of the longitudinally adjoining portion. In this self-sealing tire, a portion of the sealant that corresponds to the attachment start portion has a larger width to improve adhesion of this portion so that peeling of this portion of the sealant can be prevented.

The description of the second embodiment basically includes only features different from the first embodiment, and the contents overlapping the description of the first embodiment are omitted.

Figure 5A:
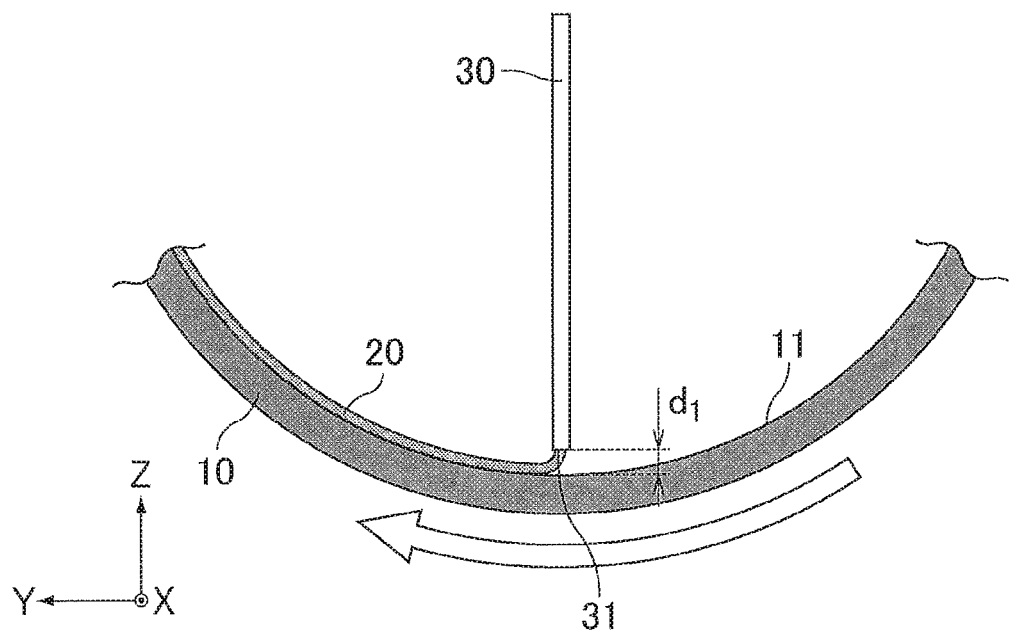
FIGS. 5A and 5B are enlarged illustrations of the vicinity of the tip of the nozzle in the applicator shown in FIG. 1.
Figure 5B:
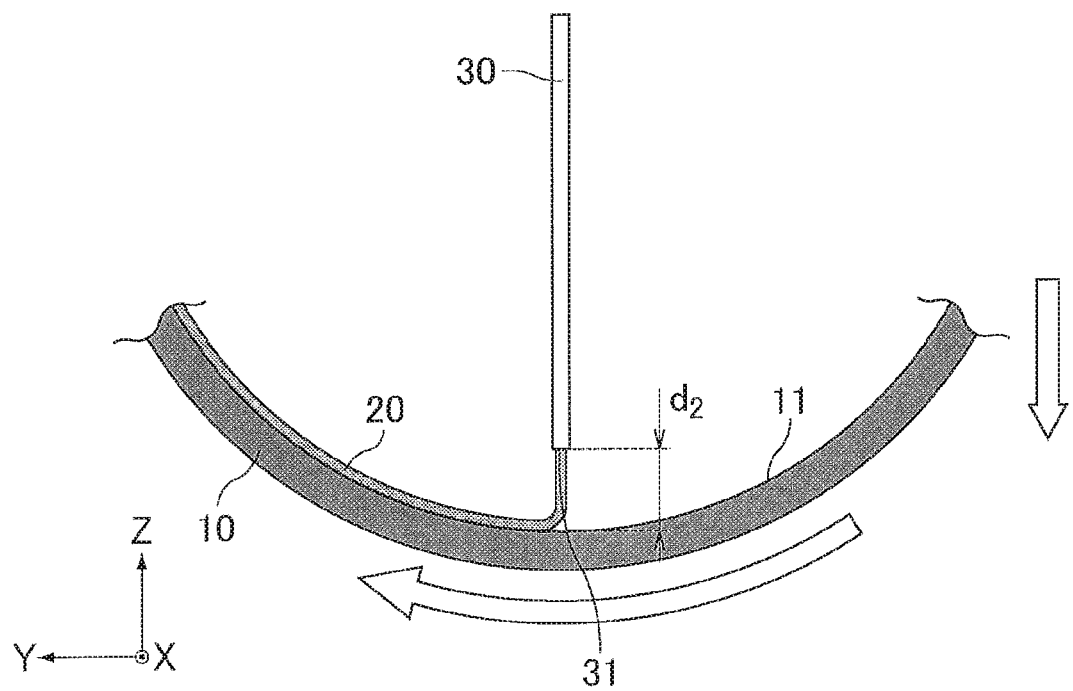

FIG. 5 are enlarged illustrations of the vicinity of the tip of the nozzle in the applicator shown in FIG. 1. FIG. 5A illustrates that immediately after attachment of the sealant is started and FIG. 5B illustrates that after a lapse of a predetermined time.

FIG. 5 each show a cross-section of a part of a tire 10 taken along a plane including the circumferential and radial directions of the tire. In FIGS. 5, the width direction (axis direction) of the tire is indicated by arrow X, the circumferential direction of the tire is indicated by arrow Y, and the radial direction of the tire is indicated by arrow Z.

According to the second embodiment, the tire 10 formed through a vulcanization step is first mounted on a rotary drive device, and a nozzle 30 is inserted into the inside of the tire 10. Then, as shown in FIGS. 1 and 5, the tire 10 is rotated and simultaneously moved in the width direction while a sealant 20 is discharged from the nozzle 30, thereby continuously applying the sealant to the inner periphery 11 of the tire 10. The tire 10 is moved in the width direction according to, for example, the pre-entered profile of the inner periphery 11 of the tire 10.

Thus, the sealant 20, which is adhesive and has a generally string shape, is continuously and spirally attached to an inner periphery 11 of the tire 10 that corresponds to a tread portion.

In this process, as shown in FIG. 5A, the sealant 20 is attached under conditions where the distance between the inner periphery 11 of the tire 10 and the tip 31 of the nozzle 30 is adjusted to a distance $d_1$ for a predetermined time from the start of attachment. Then, after a lapse of the predetermined time, as shown in FIG. 5B, the tire 10 is moved in the radial direction to change the distance to a distance $d_2$ larger than the distance $d_1$ before the sealant 20 is attached.

The distance may be changed from the distance $d_2$ back to the distance $d_1$ before completion of the attachment of the sealant. However, in view of production efficiency and tire weight balance, the distance $d_2$ is preferably maintained until the sealant attachment is completed.

Preferably, the distance $d_1$ is kept constant for a predetermined time from the start of attachment, and after a lapse of the predetermined time the distance $d_2$ is kept constant, although the distances $d_1$ and $d_2$ are not necessarily constant as long as they satisfy the relation of $d_1 < d_2$.

The distance $d_1$ is not particularly limited. In order to obtain more suitable effects, the distance $d_1$ is preferably 0.3 mm or more, more preferably 0.5 mm or more. When the distance $d_1$ is less than 0.3 mm, the tip of the nozzle is so close to the inner periphery of the tire that the sealant can easily adhere to the nozzle, which may require the nozzle to be cleaned more frequently. The distance $d_1$ is also preferably 2 mm or less, more preferably 1 mm or less. When the distance $d_1$ is more than 2 mm, the effect of the presence of a wider portion may not be sufficient.

The distance $d_2$ is also not particularly limited. To obtain more suitable effects, the distance $d_2$ is preferably 0.3 mm or more, more preferably 1 mm or more, but is preferably 3 mm or less, more preferably 2 mm or less. The distance $d_2$ is preferably the same as the adjusted distance $d_0$ described above.

Herein, the distances $d_1$ and $d_2$ between the inner periphery of the tire and the tip of the nozzle each refer to the distance in the tire radial direction between the inner periphery of the tire and the tip of the nozzle.

The rotational speed of the tire during the attachment of the sealant is not particularly critical. To obtain more suitable effects, the rotational speed is preferably 5 m/min or higher, more preferably 10 m/min or higher, but is preferably 30 m/min or lower, more preferably 20 m/min or lower. When the rotational speed is lower than 5 m/min or higher than 30 m/min, a sealant having a uniform thickness cannot be easily attached.

A self-sealing tire according to the second embodiment may be produced through the steps described above.

Figure 6:
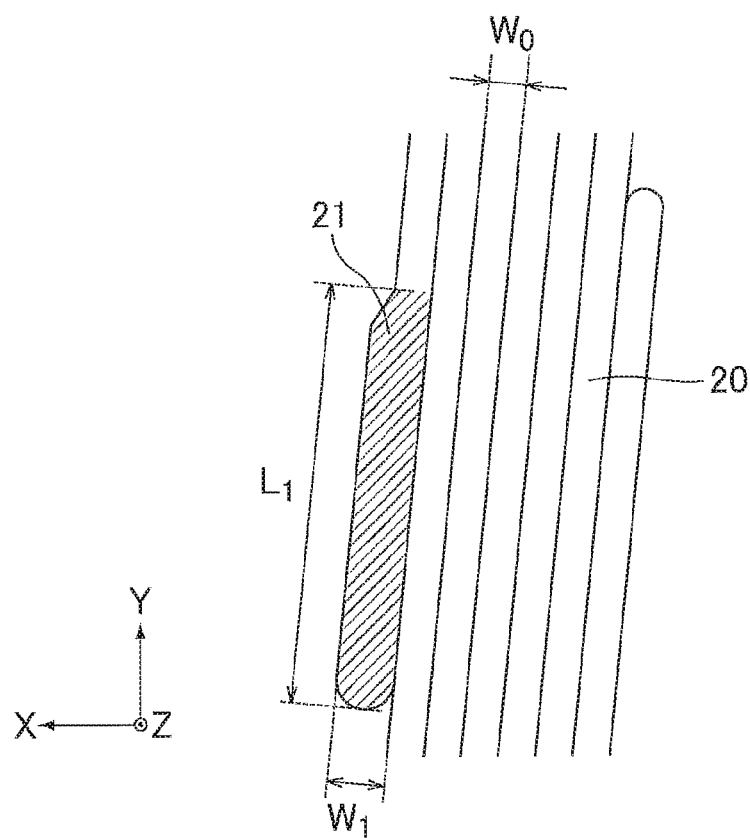
FIG. 6 is a schematic view illustrating an example of a sealant attached to a self-sealing tire.

FIG. 6 is a schematic view illustrating an example of a sealant attached to a self-sealing tire according to the second embodiment.

The generally string-shaped sealant 20 is wound in the circumferential direction of the tire and continuously and spirally attached. Here, one of the longitudinal ends of the sealant 20 forms a wider portion 21 having a width larger than that of the longitudinally adjoining portion. The wider portion 21 corresponds to the attachment start portion of the sealant.

The width of the wider portion of the sealant (the width of the wider portion of the applied sealant, length indicated by $W_1$ in FIG. 6) is not particularly critical. To obtain more suitable effects, the width of the wider portion is preferably 103% or more, more preferably 110% or more, still more preferably 120% or more of the width of the sealant other than the wider portion (length indicated by $W_0$ in FIG. 6). When it is less than 103%, the effect of the presence of a wider portion may not be sufficient. The width of the wider portion of the sealant is also preferably 210% or less, more preferably 180% or less, still more preferably 160% or less of the width of the sealant other than the wider portion. When it is more than 210%, the tip of the nozzle needs to be placed excessively close to the inner periphery of the tire to form a wider portion, with the result that the sealant can easily adhere to the nozzle, which may require the nozzle to be cleaned more frequently. In addition, tire weight balance may be impaired.

The width of the wider portion of the sealant is preferably substantially constant in the longitudinal direction but may partially be substantially non-constant. For example, the wider portion may have a shape in which the width is the largest at the attachment start portion and gradually decreases in the longitudinal direction. Herein, the substantially constant width means that the variation of the width is within a range of 90 to 110%, preferably 97 to 103%, more preferably 98 to 102%, still more preferably 99 to 101%.

The length of the wider portion of the sealant (the length of the wider portion of the applied sealant, length indicated by $L_1$ in FIG. 6) is not particularly critical. To obtain more suitable effects, the length is preferably less than 650 mm, more preferably less than 500 mm, still more preferably less than 350 mm, particularly preferably less than 200 mm. When the length is 650 mm or more, since the tip of the nozzle needs to be placed close to the inner periphery of the tire for a longer period of time, the sealant can easily adhere to the nozzle, which may require the nozzle to be cleaned more frequently. In addition, tire weight balance may be impaired. The sealant preferably has a shorter wider portion; however, from the standpoint of controlling the distance between the inner periphery of the tire and the tip of the nozzle, the limit of the length of the wider portion is about 10 mm.

The width of the sealant other than the wider portion (the width of the applied sealant other than the wider portion, length indicated by $W_0$ in FIG. 6) is not particularly critical. To obtain more suitable effects, the width is preferably 0.8 mm or more, more preferably 1.3 mm or more, still more preferably 1.5 mm or more. When the width is less than 0.8 mm, the number of turns of the sealant around the inner periphery of the tire may increase, reducing production efficiency. The width of the sealant other than the wider portion is also preferably 18 mm or less, more preferably 13 mm or less, still more preferably 9.0 mm or less, particularly preferably 7.0 mm or less, most preferably 6.0 mm or less, even most preferably 5.0 mm or less. When the width is more than 18 mm, a weight imbalance may be more likely to occur. $W_0$ is preferably the same as the above-described W.

The width of the sealant other than the wider portion is preferably substantially constant in the longitudinal direction but may partially be substantially non-constant.

The width of the area where the sealant is attached (hereinafter also referred to as the width of the attachment area or the width of the sealant layer, and corresponding to a length equal to $W_1+6\times W_0$ in FIG. 6) is not particularly critical. To obtain more suitable effects, the width is preferably 80% or more, more preferably 90% or more, still more preferably 100% or more, but preferably 120% or less, more preferably 110% or less, of the tread contact width.

To obtain more suitable effects, the width of the sealant layer is preferably 85 to 115%, more preferably 95 to 105% of the width of the breaker of the tire (the length of the breaker in the tire width direction).

In the self-sealing tire according to the second embodiment, the sealant is preferably attached without overlapping in the width direction and more preferably without gaps.

In the self-sealing tire according to the second embodiment, the other longitudinal end (the end corresponding to the attachment ending portion) of the sealant may also form a wider portion having a width larger than that of the longitudinally adjoining portion.

The thickness of the sealant (the thickness of the applied sealant or the sealant layer, length indicated by D in FIG. 8) is not particularly critical. To obtain more suitable effects, the thickness of the sealant is preferably 1.0 mm or more, more preferably 1.5 mm or more, still more preferably 2.0 mm or more, particularly preferably 2.5 mm or more, but is preferably 10 mm or less, more preferably 8.0 mm or less, still more preferably 5.0 mm or less. When the thickness is less than 1.0 mm, a puncture hole, if formed in the tire, is difficult to reliably seal. Also, a thickness of more than 10 mm is not preferred because the tire weight increases, although with little improvement in the effect of sealing puncture holes.

The thickness of the sealant (the thickness of the applied sealant or the sealant layer) is preferably substantially constant. In this case, the deterioration of tire uniformity can be further prevented to produce a self-sealing tire having a much better weight balance.

The ratio of the thickness of the sealant (the thickness of the applied sealant or the sealant layer, length indicated by D in FIG. 8) to the width of the sealant other than the wider portion (the width of the applied sealant other than the wider portion, length indicated by $W_0$ in FIG. 6) [(thickness of sealant)/(width of sealant other than wider portion)] is preferably 0.6 to 1.4, more preferably 0.7 to 1.3, still more preferably 0.8 to 1.2, particularly preferably 0.9 to 1.1. A ratio closer to 1.0 results in a sealant having an ideal string shape which permits production of a self-sealing tire having high sealing performance with higher productivity.

To obtain more suitable effects, the cross-sectional area of the sealant (the cross-sectional area of the applied sealant, area calculated by D×W in FIG. 8) is preferably 0.8 mm$^2$ or more, more preferably 1.95 mm$^2$ or more, still more preferably 3.0 mm$^2$ or more, particularly preferably 3.75 mm$^2$ or more, but is preferably 180 mm$^2$ or less, more preferably 104 mm$^2$ or less, still more preferably 45 mm$^2$ or less, particularly preferably 35 mm$^2$ or less, most preferably 25 mm$^2$ or less.

According to the second embodiment, even when the sealant has a viscosity within the range indicated earlier, and particularly when it has a relatively high viscosity, widening a portion of the sealant that corresponds to the attachment start portion improves adhesion of this portion so that peeling of this portion of the sealant can be prevented.

The self-sealing tire according to the second embodiment is preferably produced as described above. However, the self-sealing tire may be produced by any other appropriate method as long as at least one of the ends of the sealant is allowed to form a wider portion.

The above descriptions, and particularly the description of the first embodiment, explain the cases where a non-contact displacement sensor is used in applying the sealant to the inner periphery of the tire. However, the sealant may be applied to the inner periphery of the tire while controlling the movement of the nozzle and/or tire according to the pre-entered coordinate data, without measurement using a non-contact displacement sensor.

A self-sealing tire including a sealant layer located radially inside its innerliner may be produced as described above or by other methods. The sealant layer is preferably formed particularly by applying a sealant to an inner periphery of a vulcanized tire because there are further advantages such as causing less problems associated with flowing of the sealant and other factors, and being able to respond to changes in tire size by programming. For easy handling of the sealant and high productivity, it is also preferred to form the sealant layer by sequentially preparing a sealant by mixing raw materials including a crosslinking agent using a continuous kneading machine, and sequentially applying the sealant to an inner periphery of a tire.

EXAMPLES

The present invention will be specifically described with reference to, but not limited to, examples below.

The chemicals used in the examples are listed below.

Butyl rubber: Regular Butyl 065 (available from Japan Butyl Co., Ltd., Mooney viscosity $ML_{1+8}$ at 125° C.: 32)

Liquid polybutene: a combination of a liquid polybutene A (Nisseki polybutene HV300 available from JX Nippon Oil & Energy Corporation, kinematic viscosity at 40° C.: 26,000 mm$^2$/s, kinematic viscosity at 100° C.: 590 mm$^2$/s, number average molecular weight: 1,400) and a liquid polybutene B (Nisseki polybutene HV1900 available from JX Nippon Oil & Energy Corporation, kinematic viscosity at 40° C.: 160,000 mnm$^2$/s, kinematic viscosity at 100° C.: 3,710 mm$^2$/s, number average molecular weight: 2,900) at a mass ratio of 1:1

Carbon black: N330 (available from Cabot Japan K.K., HAF grade, DBP oil absorption: 102 ml/100 g)

Crosslinking activator: VULNOC GM (available from Ouchi Shinko Chemical Industrial Co., Ltd., p-benzoquinone dioxime)

Crosslinking agent: NYPER NS (available from NOF Corporation, dibenzoyl peroxide (40% dilution, dibenzoyl peroxide: 40%, dibutyl phthalate: 48%), the amount shown in Table 1 is the net benzoyl peroxide content)

Examples

<Production of Self-Sealing Tire>

According to the formulation shown in Table 1, the chemicals were introduced into a twin screw kneading extruder as follows: the butyl rubber, carbon black, and crosslinking activator were introduced from the upstream supply port; the liquid polybutene B was introduced from the midstream supply port; and the liquid polybutene A and crosslinking agent were introduced from the downstream supply port. They were kneaded at 200 rpm at a barrel temperature of 100° C. to prepare a sealant. The liquid polybutenes were heated to 50° C. before the introduction from the supply ports.
(Time for Kneading Materials)
Time for mixing butyl rubber, carbon black, and crosslinking activator: 2 minutes
Time for mixing liquid polybutene B: 2 minutes
Time for mixing liquid polybutene A and crosslinking agent: 1.5 minutes The sealant (at 100° C.) prepared sequentially as above was extruded from the twin screw kneading extruder through the nozzle to continuously and spirally attach (spirally apply) the sealant (viscosity at 40° C.: 10000 Pa·s, generally string shape) as shown in FIGS. 1 to 4 to an inner periphery of a tire (215/55R17, 94W, rim: 17×8J, cross-sectional area of cavity of tire mounted on rim: 194 cm$^2$, vulcanized, rotational speed of tire: 12 m/min, pre-heating temperature: 40° C., width of tire breaker: 180 mm) mounted on a rotary drive device, such that the width of the attachment area was 180 mm, thereby forming a first sealant layer. Next, the sealant was attached to the radially inner side of the formed sealant layer by the same procedure under the conditions shown in Table 2 to form a second sealant layer. In the formation of the second sealant layer in the examples, the sealant was applied such that the sealant of the first sealant layer and the sealant of the second sealant layer extended in directions crossing each other, while in the comparative examples, the sealant was applied such that the sealant of the first sealant layer and the sealant of the second sealant layer extended in the same direction, and the sealants of both layers were aligned without a gap (or in line with each other) in the tire width direction.

The width of each sealant was adjusted to be substantially constant in the longitudinal direction. The thickness of each sealant layer and the width of each sealant were adjusted to the values shown in Table 2. Moreover, the sealant of the first sealant layer and the sealant of the second sealant layer had the same width and the same pitch width.

The proportion of the crossed area in the examples was 100%, while that in the comparative examples was 0%.
Total volume of tire inner cavity: 36600 cm$^3$

Comparative Example 1

In Comparative Example 1, no sealant layer was formed.
The thus prepared self-sealing tires were evaluated as described below.
<Test 1 (Tear Resistance of Sealant Layer)>

The initial internal pressure of the tires was adjusted to 250 kPa, and 20 nails (shank diameter: 5.2 mm) prescribed in JIS N150 processed to a length of 50 mm were driven at an ambient temperature of 0° C. into the block portion of each tire until the heads of the nails contacted the surface. One hour later, the nails were removed, and the tires were left at an ambient temperature of 0° C. for a full day. Thereafter, the rim was removed from each tire to count the number of tears in the sealant layer.

A smaller number indicates that the sealant layer has better tear resistance.
<Test 2 (Sealing Performance after Running)>

The initial internal pressure of the tires was adjusted to 250 kPa, and 20 nails (shank diameter: 5.2 mm) prescribed in JIS N150 processed to a length of 50 mm were driven at an ambient temperature of 25° C. into the block portion of each tire until the heads of the nails contacted the surface. The tires were subjected to 750 km running on a drum at an ambient temperature of 25° C., a speed of 150 km/h, and a load of 4.2 kN. Thereafter, the nails were removed, and the tires were left at an ambient temperature of 25° C. for a full day. Then, soap water was applied to count the number of nail holes with no air leakage.

A larger number indicates better sealing performance after running. Tires with a number of 5 or larger are considered good.
<Test 3 (Sealing Performance at Low Temperatures)>

The tires were subjected to running on a drum under the same conditions as in Test 2. Then, the tires were left for 12 hours in a room at an ambient temperature of −10°. Thereafter, the nails were removed, and soap water was applied to count the number of nail holes with no air leakage.

A larger number indicates better sealing performance at low temperatures. Tires with a number of 7 or larger are considered good.

TABLE 1

|  |  | Low viscosity sealant layer | | | High viscosity sealant layer | | |
|---|---|---|---|---|---|---|---|
|  |  | a | b | c | d | e | f |
| Amounts (parts by mass) | Butyl rubber | 100 | 100 | 100 | 100 | 100 | 100 |
|  | Liquid polybutene | 200 | 250 | 300 | 250 | 200 | 150 |
|  | Carbon black | 10 | 20 | 40 | 40 | 50 | 65 |
|  | Crosslinking activator (p-benzoquinone dioxime) | 5 | 10 | 15 | 15 | 20 | 25 |
|  | Crosslinking agent (dibenzoyl peroxide) | 5 | 10 | 15 | 15 | 20 | 25 |
| Viscosity at 0° C. (kPa · s) |  | 18 | 20 | 33 | 35 | 40 | 55 |
| Viscosity at 95° C. (kPa · s) |  | 2 | 3.5 | 5 | 6 | 7 | 10 |

TABLE 2

| | | Comp. Ex. 1 | Comp. Ex. 2 | Comp. Ex. 3 | Comp. Ex. 4 | Ex. 1 | Ex. 2 | Ex. 3 | Ex. 4 | Ex. 5 |
|---|---|---|---|---|---|---|---|---|---|---|
| Sealant layer on innerliner side | Type | None | b | e | b | b | e | b | b | b |
| | Thickness (mm) | — | 2 | 2 | 2 | 2 | 2 | 2 | 2 | 2 |
| | Angle $\alpha 1$ (°) of sealant of first sealant layer relative to tire circumferential direction | — | 0.086 | 0.086 | 0.086 | 0.086 | 0.086 | 0.057 | 0.143 | 0.086 |
| Sealant layer on tire cavity side | Type | None | b | e | e | b | e | b | b | b |
| | Thickness (mm) | — | 2 | 2 | 2 | 2 | 2 | 2 | 2 | 2 |
| | Angle $\alpha 2$ (°) of sealant of second sealant layer relative to tire circumferential direction | — | 0.086 | 0.086 | 0.086 | 0.086 | 0.086 | 0.057 | 0.143 | 0.086 |
| Total thickness of sealant layers (mm) | | — | 4 | 4 | 4 | 4 | 4 | 4 | 4 | 4 |
| Width of sealant (mm) | | | 3 | 3 | 3 | 3 | 3 | 2 | 5 | 2 |
| Pitch [T] (mm) | | | 3 | 3 | 3 | 3 | 3 | 2 | 5 | 3 |
| Crossing of sealants of two layers | | | No | No | No | Yes | Yes | Yes | Yes | Yes |
| Crossing angle $\theta$ (°) of sealants of two layers | | — | 0.172 | 0.172 | 0.172 | 0.172 | 0.172 | 0.114 | 0.286 | 0.172 |
| Contact between adjacent portions of sealant in each layer | | | Yes | Yes | Yes | Yes | Yes | Yes | Yes | No |
| Test 1 (Tear resistance of sealant layer) | Number of tears in sealant layer after driving of nails | — | 7 | 10 | 10 | 0 | 0 | 1 | 1 | 1 |
| Test 2 (Sealing performance after running) | Number of successful air seals when nails were removed after running with driven nails | 0 | 4 | 10 | 12 | 7 | 18 | 8 | 8 | 5 |
| Test 3 (Sealing performance at low temperatures) | Number of successful air seals as in Test 2 but with an ambient terrperature upon removing nails of −10° C. | 0 | 14 | 4 | 12 | 18 | 7 | 17 | 17 | 14 |

| | | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|
| Sealant layer on innerliner side | Type | a | a | a | b | b | b | c | c | c |
| | Thickness (mm) | 2 | 2 | 2 | 2 | 2 | 2 | 2 | 2 | 2 |
| | Angle $\alpha 1$ (°) of sealant of first sealant layer relative to tire circumferential direction | 0.086 | 0.086 | 0.086 | 0.086 | 0.086 | 0.086 | 0.086 | 0.086 | 0.086 |
| Sealant layer on tire cavity side | Type | d | e | f | d | e | f | d | e | f |
| | Thickness (mm) | 2 | 2 | 2 | 2 | 2 | 2 | 2 | 2 | 2 |
| | Angle $\alpha 2$ (°) of sealant of second sealant layer relative to tire circumferential direction | 0.086 | 0.086 | 0.086 | 0.086 | 0.086 | 0.086 | 0.086 | 0.086 | 0.086 |
| Total thickness of sealant layers (mm) | | 4 | 4 | 4 | 4 | 4 | 4 | 4 | 4 | 4 |
| Width of sealant (mm) | | 3 | 3 | 3 | 3 | 3 | 3 | 3 | 3 | 3 |
| Pitch [T] (mm) | | 3 | 3 | 3 | 3 | 3 | 3 | 3 | 3 | 3 |
| Crossing of sealants of two layers | | Yes | Yes | Yes | Yes | Yes | Yes | Yes | Yes | Yes |
| Crossing angle $\theta$ (°) of sealants of two layers | | 0.172 | 0.172 | 0.172 | 0.172 | 0.172 | 0.172 | 0.172 | 0.172 | 0.172 |
| Contact between adjacent portions of sealant in each layer | | Yes | Yes | Yes | Yes | Yes | Yes | Yes | Yes | Yes |
| Test 1 (Tear resistance of sealant layer) | Number of tears in sealant layer after driving of nails | 0 | 0 | 0 | 0 | 0 | 0 | 0 | 0 | 0 |
| Test 2 (Sealing performance after running) | Number of successful air seals when nails were removed after running with driven nails | 18 | 19 | 20 | 19 | 20 | 20 | 20 | 20 | 20 |

TABLE 2-continued

| | | | | | | | | | |
|---|---|---|---|---|---|---|---|---|---|
| Test 3 (Sealing performance at low temperatures) | Number of successful air seals as in Test 2 but with an ambient terrperature upon removing nails of −10° C. | 20 | 20 | 20 | 18 | 18 | 18 | 16 | 16 | 16 |

| | | Ex. 15 | Ex. 16 | Ex. 17 | Ex. 18 | Ex. 19 | Ex. 20 | Ex. 21 | Ex. 22 |
|---|---|---|---|---|---|---|---|---|---|
| Sealant layer on innerliner side | Type | b | b | b | b | b | b | b | b |
| | Thickness (mm) | 1 | 3 | 4 | 5 | 2 | 2 | 2 | 2 |
| | Angle α1 (°) of sealant of first sealant layer relative to tire circumferential direction | 0.086 | 0.086 | 0.086 | 0.086 | 0.086 | 0.086 | 0.086 | 0.086 |
| Sealant layer on tire cavity side | Type | e | e | e | e | e | e | e | e |
| | Thickness (mm) | 2 | 2 | 2 | 2 | 1 | 3 | 4 | 5 |
| | Angle α2 (°) of sealant of second sealant layer relative to tire circumferential direction | 0.086 | 0.086 | 0.086 | 0.086 | 0.086 | 0.086 | 0.086 | 0.086 |
| Total thickness of sealant layers (mm) | | 3 | 5 | 6 | 7 | 3 | 5 | 6 | 7 |
| Width of sealant (mm) | | 3 | 3 | 3 | 3 | 3 | 3 | 3 | 3 |
| Pitch [T] (mm) | | 3 | 3 | 3 | 3 | 3 | 3 | 3 | 3 |
| Crossing of sealants of two layers | | Yes | Yes | Yes | Yes | Yes | Yes | Yes | Yes |
| Crossing angle θ (°) of sealants of two layers | | 0.172 | 0.172 | 0.172 | 0.172 | 0.172 | 0.172 | 0.172 | 0.172 |
| Contact between adjacent portions of sealant in each layer | | Yes | Yes | Yes | Yes | Yes | Yes | Yes | Yes |
| Test 1 (Tear resistance of sealant layer) | Number of tears in sealant layer after driving of nails | 0 | 0 | 0 | 0 | 0 | 0 | 0 | 0 |
| Test 2 (Sealing performance after running) | Number of successful air seals when nails were removed after running with driven nails | 19 | 20 | 20 | 20 | 7 | 18 | 20 | 20 |
| Test 3 (Sealing performance at low temperatures) | Number of successful air seals as in Test 2 but with an ambient terrperature upon removing nails of −10° C. | 8 | 19 | 20 | 20 | 17 | 19 | 20 | 20 |

The pneumatic tires (self-sealing tires) of the examples included an innerliner and a sealant layer located radially inside the innerliner, wherein the sealant layer included a first sealant layer and a second sealant layer stacked in that order from the innerliner, the first sealant layer included a generally string-shaped sealant provided continuously and spirally along an inner periphery of the tire, the second sealant layer included a generally string-shaped sealant provided continuously and spirally along the first sealant layer, and the sealant of the first sealant layer and the sealant of the second sealant layer extended in directions crossing each other. The sealant layer of the examples exhibited excellent tear resistance despite its being formed of a generally string-shaped sealant provided continuously and spirally along an inner periphery of the tire. Further, good sealing performance after running and good sealing performance at low temperatures were also achieved.

Moreover, both high-level sealing performance after running and sealing performance at low temperatures were achieved in the pneumatic tires including an innerliner and a sealant layer located radially inside the innerliner, wherein the sealant layer included a first sealant layer and a second sealant layer stacked in that order from the innerliner, and the first sealant layer had a lower viscosity than the second sealant layer.

REFERENCE SIGNS LIST 10 tire
11 tire inner periphery
14 tread portion
15 carcass
16 breaker
17 band
19 innerliner
20 sealant
20a sealant of first sealant layer
20b sealant of second sealant layer
21 wider portion
22 sealant layer
22a first sealant layer
22b second sealant layer
30 nozzle
31 tip of nozzle
40 non-contact displacement sensor
50 rotary drive device
60 twin screw kneading extruder
61 (61a, 61b, 61c) supply port
62 material feeder
d, $d_0$, $d_1$, $d_2$ distance between inner periphery of tire and tip of nozzle
A nail

The invention claimed is:

1. A pneumatic tire, comprising an innerliner and a sealant layer located radially inside the innerliner,
- the sealant layer comprising a first sealant layer and a second sealant layer stacked in that order from the innerliner,
- the first sealant layer comprising a generally string-shaped sealant provided continuously and spirally along an inner periphery of the tire,
- the second sealant layer comprising a generally string-shaped sealant provided continuously and spirally along the first sealant layer, and
- the sealant of the first sealant layer and the sealant of the second sealant layer extending in directions crossing each other,
- wherein an angle of the generally string-shaped sealant in the first sealant layer relative to the tire circumferential direction is between 0.025° and 0.200° and an angle of the generally string-shaped sealant in the second sealant layer relative to the tire circumferential direction is between 0.025° and 0.200°.

2. The pneumatic tire according to claim 1,
- wherein the sealant of the first sealant layer and the sealant of the second sealant layer both have a pitch width of 2 mm to 5 mm, and
- the sealant of the first sealant layer and the sealant of the second sealant layer extend in directions crossing each other at an angle θ satisfying the following equation (1):

$$\theta = \arctan(\text{the pitch width of the sealant of the first sealant layer/the inner perimeter of the tire}) + \arctan(\text{the pitch width of the sealant of the second sealant layer/the inner perimeter of the tire}).$$

3. The pneumatic tire according to claim 1,
- wherein the first sealant layer and the second sealant layer have different viscosities from each other.

4. The pneumatic tire according to claim 1,
- wherein the first sealant layer has a lower viscosity than the second sealant layer.

5. The pneumatic tire according to claim 1,
- wherein the first sealant layer and the second sealant layer have different thicknesses from each other.

6. A pneumatic tire, comprising an innerliner and a sealant layer located radially inside the innerliner,
- the sealant layer comprising a first sealant layer and a second sealant layer stacked in that order from the innerliner,
- the first sealant layer comprising a generally string-shaped sealant provided continuously and spirally along an inner periphery of the tire,
- the second sealant layer comprising a generally string-shaped sealant provided continuously and spirally along the first sealant layer, and
- the sealant of the first sealant layer and the sealant of the second sealant layer extending in directions crossing each other,
- wherein an angle at which a direction of the generally string-shaped sealant in the first sealant layer intersects a direction along which the generally string-shaped sealant in the second sealant layer relative to the tire circumferential direction is between 0.050° and 0.400°.

* * * * *